US012721313B2

(12) United States Patent
Markham

(10) Patent No.: US 12,721,313 B2
(45) Date of Patent: Sep. 1, 2026

(54) ANIMAL GROOMING DEVICE WITH FEATURE FOR TOPICAL APPLICATION OF THERAPEUTIC MATERIAL

(71) Applicant: Bounce Enterprises LLC, Golden, CO (US)

(72) Inventor: Joseph P. Markham, Golden, CO (US)

(73) Assignee: Bounce Enterprises LLC, Golden, CO (US)

( * ) Notice: Subject to any disclaimer, the term of this patent is extended or adjusted under 35 U.S.C. 154(b) by 0 days.

(21) Appl. No.: 19/313,641

(22) Filed: Aug. 28, 2025

(65) Prior Publication Data

US 2025/0386800 A1 Dec. 25, 2025

Related U.S. Application Data

(63) Continuation-in-part of application No. 18/493,449, filed on Oct. 24, 2023, which is a continuation-in-part of application No. 18/476,230, filed on Sep. 27, 2023.

(51) Int. Cl.
*A01K 13/00* (2006.01)

(52) U.S. Cl.
CPC .......... *A01K 13/002* (2013.01); *A01K 13/003* (2013.01)

(58) Field of Classification Search
CPC ..... A01K 13/00; A01K 13/002; A01K 13/003
See application file for complete search history.

(56) References Cited

U.S. PATENT DOCUMENTS 455,567 A * 7/1891 Kraft ....................... A47L 13/16 15/118
4,343,265 A * 8/1982 Belschner ............ A01K 13/002 119/633
4,970,990 A * 11/1990 Wilhelmi ............. A01K 13/002 119/633
4,995,344 A * 2/1991 Olson .................. A01K 13/002 119/603
D321,434 S * 11/1991 Strickler ...................... D30/158
D326,362 S * 5/1992 Bertwell ...................... D30/158
(Continued)

FOREIGN PATENT DOCUMENTS

CA 2503178 A1 * 4/2006 ........... A01K 13/001
CN 204616707 U * 9/2015 ........... A01K 13/003
(Continued)

OTHER PUBLICATIONS

International Search Report and Written Opinion received in International application No. PCT/US24/45362, mailed on Oct. 22, 2024, 8 pages.

*Primary Examiner* — Monica L Perry
*Assistant Examiner* — Aaron M Rodziwicz
(74) *Attorney, Agent, or Firm* — Berg Hill Greenleaf Ruscitti LLP

(57) ABSTRACT

An animal grooming device includes a body, a plurality of grooming elements secured to the body, an upper peripheral rim extending around a periphery of the body, the upper peripheral rim and top side of the body forming an enclosure. An applicator pad is placed within said enclosure to selectively control dispensing of material through an exposed surface of the applicator pad. The body is flexible and elastomeric so that the body can be twisted to selectively and controllably change the amount and rate at which material is discharged through the applicator pad.

23 Claims, 21 Drawing Sheets

(56) References Cited

U.S. PATENT DOCUMENTS

| | | | | | |
|---|---|---|---|---|---|
| D326,562 | S * | 6/1992 | Bertwell | D30/158 | |
| 6,685,376 | B2 * | 2/2004 | Weihrauch | A47L 13/16 | 401/196 |
| 9,498,092 | B2 * | 11/2016 | Chang | A46B 9/005 | |
| D840,694 | S * | 2/2019 | Yun | D4/127 | |
| D850,799 | S * | 6/2019 | Johnson | D30/158 | |
| 10,334,994 | B1 * | 7/2019 | Burd | A47K 7/028 | |
| 10,390,605 | B1 * | 8/2019 | Schechter | A01K 13/002 | |
| 10,694,719 | B2 * | 6/2020 | Johnson | A01K 13/001 | |
| D898,376 | S * | 10/2020 | Johnson | D4/134 | |
| D903,955 | S * | 12/2020 | Singer | D30/158 | |
| D928,407 | S * | 8/2021 | Qi | D28/63 | |
| 2001/0037772 | A1 * | 11/2001 | Huddleston | A01K 13/002 | 15/151 |
| 2004/0225248 | A1 * | 11/2004 | Klein | A61F 13/15634 | 602/42 |
| 2005/0072374 | A1 * | 4/2005 | Claire | A01K 13/001 | 119/652 |
| 2006/0102094 | A1 * | 5/2006 | Dunn | A01K 13/001 | 119/632 |
| 2007/0144451 | A1 * | 6/2007 | Hurwitz | A01K 13/003 | 119/603 |
| 2013/0008388 | A1 * | 1/2013 | Chancy | A01K 13/003 | 119/604 |
| 2013/0284111 | A1 * | 10/2013 | Simon | A45D 24/30 | 119/677 |
| 2015/0000609 | A1 * | 1/2015 | Frye | A01K 13/001 | 119/625 |
| 2015/0327746 | A1 * | 11/2015 | Winston | B08B 1/143 | 15/227 |
| 2016/0262346 | A1 * | 9/2016 | Rifkin | A01K 15/02 | |
| 2017/0049076 | A1 * | 2/2017 | Takla | A46B 11/0062 | |
| 2018/0110202 | A1 * | 4/2018 | Michael | A01K 13/002 | |
| 2018/0132452 | A1 * | 5/2018 | Dionne | A46B 9/023 | |
| 2018/0368363 | A1 * | 12/2018 | Johnson | A01K 13/002 | |
| 2019/0141949 | A1 * | 5/2019 | Alva | A01K 13/001 | 119/602 |
| 2022/0361447 | A1 * | 11/2022 | Mahtani | A46B 15/0081 | |

FOREIGN PATENT DOCUMENTS

| | | | | |
|---|---|---|---|---|
| GB | 2510146 | A * | 7/2014 | A01K 13/00 |
| GB | 2569033 | A * | 6/2019 | A01K 13/003 |
| WO | WO-9515679 | A1 * | 6/1995 | A46B 1/00 |
| WO | WO-2006079817 | A1 * | 8/2006 | A46B 5/0025 |
| WO | WO-2009149569 | A1 * | 12/2009 | A01K 13/002 |
| WO | WO-2021060733 | A1 * | 4/2021 | A46B 7/026 |
| WO | WO-2023278830 | A1 * | 1/2023 | A46B 9/026 |

* cited by examiner 12
22
62
16
26
62
48
60
30
62
40
48
16
22
26
30

ANIMAL GROOMING DEVICE WITH FEATURE FOR TOPICAL APPLICATION OF THERAPEUTIC MATERIAL

CROSS REFERENCE TO RELATED APPLICATIONS

This application is a continuation in part of U.S. application Ser. No. 18/493,449 filed on Oct. 24, 2023, which is a continuation in part of U.S. application Ser. No. 18/476,230 filed on Sep. 27, 2023. The entire specification and figures of the above-referenced application are hereby incorporated, in their entirety by reference.

The invention generally relates to combs or brushes for animals, and more particularly, to a pet or animal grooming device that can selectively deliver therapeutic material at the same time the grooming device is used to groom or clean the animal.

FIELD OF THE INVENTION

Background of the Invention

Brushes and combs for animals are often similar to brushes and combs for humans. A standard comb or brush typically has a shaft or body and a plurality of teeth that extend linearly along the length of the body. A handle is connected to the body. Combs have teeth that are commonly of the same size, shape and spacing from one another. A standard brush includes a plurality of bristles made of a flexible material and mounted to the body of the brush. Brushes and combs are usually designed for single purpose use. Grooming kits may include various types of brushes and combs in order to provide a user with functional use options for grooming.

Some dog breeds have short hair of uniform length and texture, while other dog breeds may have longer hair and two coats with differing textures and lengths. Some dogs have an undercoat of soft fine fur and an overcoat of longer, stiffer fur. As one can appreciate, having the capability to address grooming requirements for a multitude of different types of animal coats can require a relatively large number of grooming utensils which is one reason why grooming kits are sold.

One aspect of grooming may also comprise washing of the animal. There are specific animal shampoos and conditioners sold for pets like dogs and cats. The application of shampoo onto an animal is typically achieved by the owner's hands or by use of a washcloth. The same is true for application of a conditioner; working the conditioner into the animals fur is typically done by hand or by a washcloth.

Over time, the type and number of products for grooming animals has greatly increased. The expansion of grooming products is consistent with the expansion of health products made available for animals as well. A robust fur coat is essential for the basic health maintenance of dogs and cats. While grooming an animal first by washing the animal and then combing or brushing the animal is the most common maintenance activity for animal fur, products have been introduced into the market to enhance traditional grooming. For example, grooming supplements search as coconut oil and oatmeal bath formulations are available for pets to help an animal maintain a robust coat of fur. Pheromone sprays are known to help reduce anxiety in an animal.

One problem associated with the use of supplements applied to an animal's skin and fur is that there is no reliable way of evenly distributing the supplements if the pet owner simply uses a common comb or brush. While the owner may attempt to evenly spray or otherwise pour the supplement onto the animal, the particular location where the supplement is initially applied will most likely have the greatest concentration of the supplement. Further, even if the owner is particularly diligent in attempting to evenly distribute the supplement onto the animal, it is still difficult to evenly and controllably apply the supplement in a known quantity to a desired area of the animal.

Considering the existing drawbacks with respect to having to use multiple grooming devices and the inability to controllably apply supplements, there is a need for a multi-purpose grooming device that can not only facilitate the traditional grooming functions of shampooing and conditioner application but can also controllably deliver a supplement to the skin and fur of an animal.

Relative directional or geometric terms may be used herein to describe specific parts of the device of the invention. For example, the terms "upper" and "lower," or "sides," or other terms may be used herein, but it shall be understood that these are only relative terms and are provided for convenience of understanding various preferred embodiments as they may be depicted in the figures. Therefore, the invention is not limited to any particular spatial or geometric orientation in relation to the relative terms used to describe the invention.

As set forth herein, the grooming device of the present invention provides many advantages over existing grooming devices, as one will appreciate from a review of the following description of the invention and accompanying drawings.

SUMMARY OF THE INVENTION

The invention is a grooming device that is especially adapted for grooming the fur of animals and to selectively and controllably deliver or apply a desired material onto an animal's skin and fur. According to one preferred embodiment, the grooming device comprises a body that is shaped to allow for gripping in the hand of a user. The body has a plurality of grooves or indentations that are formed on the outer side edge of the body. For example, according to one preferred embodiment, there are at least three indentations on opposite side edges of the body that are arranged to conveniently conform with the user's fingers on one side of the body of the device and the user's thumb on the other side of the body. Both ends of the body may further include a depression that can be used to receive one or more fingers or the thumb of a user such that the user is able to control the grooming device not only along the side edges of the body, but also at the ends of the body. In short, the grooves/indentations and depressions are intended to provide an ergonomic grooming device that is easily grasped and held by the user so that the grooming device can be moved in any desired direction. A lower surface of the grooming device includes a plurality of grooming elements. The grooming elements are preferably flexible and elastomeric so that not only can the grooming elements bend, but the grooming elements can also stretch and contract as the grooming elements contact an animal's fur. According to one aspect of an embodiment, it is desirable to have the grooming elements made of a material that has a specified durometer hardness range that facilitates an optimal or targeted grooming function. The grooming elements may have a truncated conical shape in which the larger end of the truncated cone is located and connects to the lower surface of the body.

The device according to the first embodiment further includes an opposite upper surface and an outwardly extending peripheral wall. The peripheral wall and the upper surface form a reservoir or enclosure that has multiple functions as described below. The peripheral wall can be considered an extension of the side surfaces such that the indentations are formed continuously along the side surfaces of the body.

According to another embodiment of the invention, an absorbent pad or applicator is provided that may be placed within the reservoir or enclosure of the body. The applicator may, for example, be made of a sponge-like material that is capable of holding an amount of a liquid such as shampoo or conditioner. The shape of the applicator may conform to the peripheral wall such that the applicator conveniently fits within the reservoir and does not significantly shift or move as pressure may be applied to the applicator by a user. Accordingly, the applicator may also have plurality of grooves and indentations which match those located on the peripheral wall.

According to one embodiment of the invention incorporating the applicator, the applicator may be made a single material. According to another embodiment, the applicator may be made of multiple layers of materials, for example, the applicator may be constructed of an absorbent sponge like material, and the upper exposed surface of the applicator may include a second layer of a less porous material with a roughened texture that can be used for scrubbing.

According to a method of the invention, liquids placed within the reservoir can be used to selectively deliver therapeutic materials to the skin and fur of an animal. The materials can include shampoo, conditioner, medications, pheromones, and other materials that might be beneficial if applied to the animal.

In use, the user applies a desired amount of the therapeutic material to the applicator or may fill the reservoir with the material. The user grasps the device with the applicator placed in the reservoir and the therapeutic material is then selectively applied to the animal by contact of the upper exposed surface of the applicator against the fur of the animal. The device at various times may be turned over and the user conducts a brushing motion so that the grooming elements contact the fur and help the material to penetrate the fur of the animal and/or to massage the skin of the animal. The applicator is capable of holding an amount of therapeutic material such that repeated contact of the applicator can be made at various parts along the animal's fur.

One should be able to appreciate that the device of the invention provides multiple functions in that the opposite sides of the device have respective functions, and a user therefore does not have to separately pour or spray material onto the animal. With respect to the embodiment of the applicator that may have the second layer of material, this layer can be used to help scrub the skin of the animal or to otherwise apply additional frictional force to portions of the animal. For example, it may be necessary to more vigorously scrub the legs and feet of an animal in which case the second layer of the applicator becomes an ideal solution because a separate device is not required.

According to another preferred embodiment of the device of the invention, A second applicator may be provided that is secured to the surface of the device having the grooming elements. The second applicator has a plurality of holes that match the size and configuration of the grooming elements. The second applicator can be secured to the device by aligning the holes of the second applicator with the bristles and then pushing the applicator against the lower surface of the body. The holes are sized such that the grooming elements can frictionally engage the applicator to thereby hold the second applicator in place when in use. Like the first applicator, the second applicator may be made of a porous material and may have one or more layers. The second applicator can therefore be used to selectively apply therapeutic material to the skin and fur of the animal.

The first and second applicators can be used separately or simultaneously. Depending upon the particular grooming activity being conducted, it may be advantageous to have different therapeutic materials retained by the respective applicators.

According to another embodiment of the invention, it may include a plurality of passageways or openings that are formed through the body of the device. These passageways or openings therefore allow the therapeutic material to be applied to the skin and fur of the animal along the lower surface of the device while the first applicator remains in place. The user can selectively apply pressure to the first applicator in which the therapeutic material is dispensed from the first applicator and then flows through the passageways. The number and size of the passageways can be selected to control the rate at which the therapeutic material is allowed to be dispensed.

According to this last embodiment of the invention, it may further include a pressure applying implement that covers the upper exposed surface of the first applicator. The pressure applying implement is used to apply pressure onto the first applicator to thereby selectively meter an amount of the therapeutic material desired to be dispensed onto to the animal.

Based on the foregoing description of the grooming device, the invention according to one aspect may be considered an animal grooming device comprising: a body; a plurality of grooming elements secured to a bottom side the body, said grooming elements having substantially similar shapes and being spaced uniformly from one another along the bottom side; an upper peripheral rim extending around a periphery of a top side of the body, said upper peripheral rim extending above the top side; a plurality of indentations formed along an outer side edge of the body; at least one depression formed on an end of the body; and wherein said top side of the body and said upper peripheral rim form a reservoir for holding a quantity of material therein.

According to another aspect of the invention, it may be considered an animal grooming device comprising: a body; a plurality of grooming elements secured to a bottom side the body, said grooming elements having substantially similar shapes and being spaced uniformly from one another along the bottom side; an upper peripheral rim extending around a periphery of a top side of the body, said upper peripheral rim extending above the top side; said top side of the body and said upper peripheral rim forming a reservoir; a first applicator pad placed within said reservoir that holds a quantity of material therein; and wherein pressure applied to said body or said first applicator pad causes the material to be dispensed from the first applicator pad.

According to yet another aspect of the invention, it may be considered a method of delivering a therapeutic material by a grooming device to an animal, the method comprising: providing the grooming device having a body, a plurality of grooming elements secured to a bottom side of the body, an upper peripheral rim extending around a periphery of a top side of the body, said upper peripheral rim extending above the top side; said top side of the body and said upper peripheral rim forming a reservoir; placing a first applicator pad within said reservoir that holds a quantity of the therapeutic material therein; and applying pressure to said body or said first applicator pad causing the material to be dispensed from the first applicator pad.

According to yet another aspect of the invention, it may be considered an animal grooming device comprising: a body, a plurality of grooming elements secured to a bottom side the body, said grooming elements having substantially similar shapes and being spaced uniformly from one another along the bottom side, an upper peripheral rim extending around a periphery of a top side of the body, said upper peripheral rim extending above the top side, said top side of the body and said upper peripheral rim forming an enclosure, a large opening made in the top side of the body, an applicator pad placed within said enclosure, wherein the applicator extends beyond the top side and bottom side of the body.

Many optional features may be associated with the immediately foregoing described animal grooming device. These features may include any one or all of the following: the grooming elements are conical shaped; the grooming elements have a durometer hardness of between about 40-60 durometer hardness; the at least one depression includes two depression, one depression being located at each opposite end of the body; the grooming device is symmetrical along a longitudinal axis thereof that extends along a length of the body; the grooming device is symmetrical along a transverse axis thereof that extends transversely to a length of the body; the upper peripheral rim has a peripheral plurality of indentations that correspond with and extending uniformly with respect to said plurality of indentations formed on said outer side edge of the body; opposite ends of the body have outwardly curving side edges; the applicator pad has a shape that conforms to said enclosure in order to frictionally retain said applicator within said enclosure; the applicator pad has a single layer; the applicator pad has at least two layers; a second layer of said applicator pad has a rougher texture than said first layer; the applicator extends beyond the grooming elements; the applicator has a length that is longer than a width of the applicator, and the large opening has a long side and short side and the applicator is placed through the opening such that the length is aligned with the long side; the applicator has a length that is longer than a width of the applicator, and the large opening has a long side and short side, wherein the applicator is placed through the opening such that the width is placed through the opening and the length is substantially perpendicular to the long side of the opening; the applicator has a length that is longer than a width of the applicator, and the applicator is folded prior to being placed through said large opening;

According to yet another aspect of the invention, it may be considered a method of delivering a therapeutic material by a grooming device to an animal, said method comprising: providing the grooming device having a body, a plurality of grooming elements secured to a bottom side of the body, an upper peripheral rim extending around a periphery of a top side of the body, said upper peripheral rim extending above the top side; said top side of the body and said upper peripheral rim forming an enclosure, and a large opening made in the body; and placing an applicator pad within said enclosure that holds a quantity of the therapeutic material therein; and applying pressure to said body or said applicator pad causing the material to be dispensed from the applicator pad.

According to yet another aspect of the invention, it may be considered an animal grooming device comprising: a body, a plurality of grooming elements secured to a bottom side the body, an upper peripheral rim extending around a periphery of a top side of the body, said upper peripheral rim extending above the top side, said top side of the body and said upper peripheral rim forming an enclosure, a large opening made in the top side of the body, an applicator pad placed within said enclosure, wherein the applicator extends beyond the top side and bottom side of the body, and wherein the body is flexible and elastomeric such that the body is twisted to change the shape of the applicator as it is held in the opening resulting in the applicator pad being wrung out to change the amount and rate at which the therapeutic material is released from the applicator pad.

According to yet another aspect of the invention, it may be considered an animal grooming device comprising: a body, a plurality of grooming elements secured to a bottom side the body, an upper peripheral rim extending around a periphery of a top side of the body, said upper peripheral rim extending above the top side, said top side of the body and said upper peripheral rim forming an enclosure, an opening made in the top side of the body, an applicator pad placed within said enclosure, wherein the applicator extends beyond the top side and bottom side of the body; and wherein said body is twisted along its length resulting in said applicator also being twisted and said applicator remaining secured to said body in said enclosure.

Other features and advantages of the invention will become apparent by a review of the following detailed description and drawings.

DETAILED DESCRIPTION OF THE INVENTION

Figure 1:
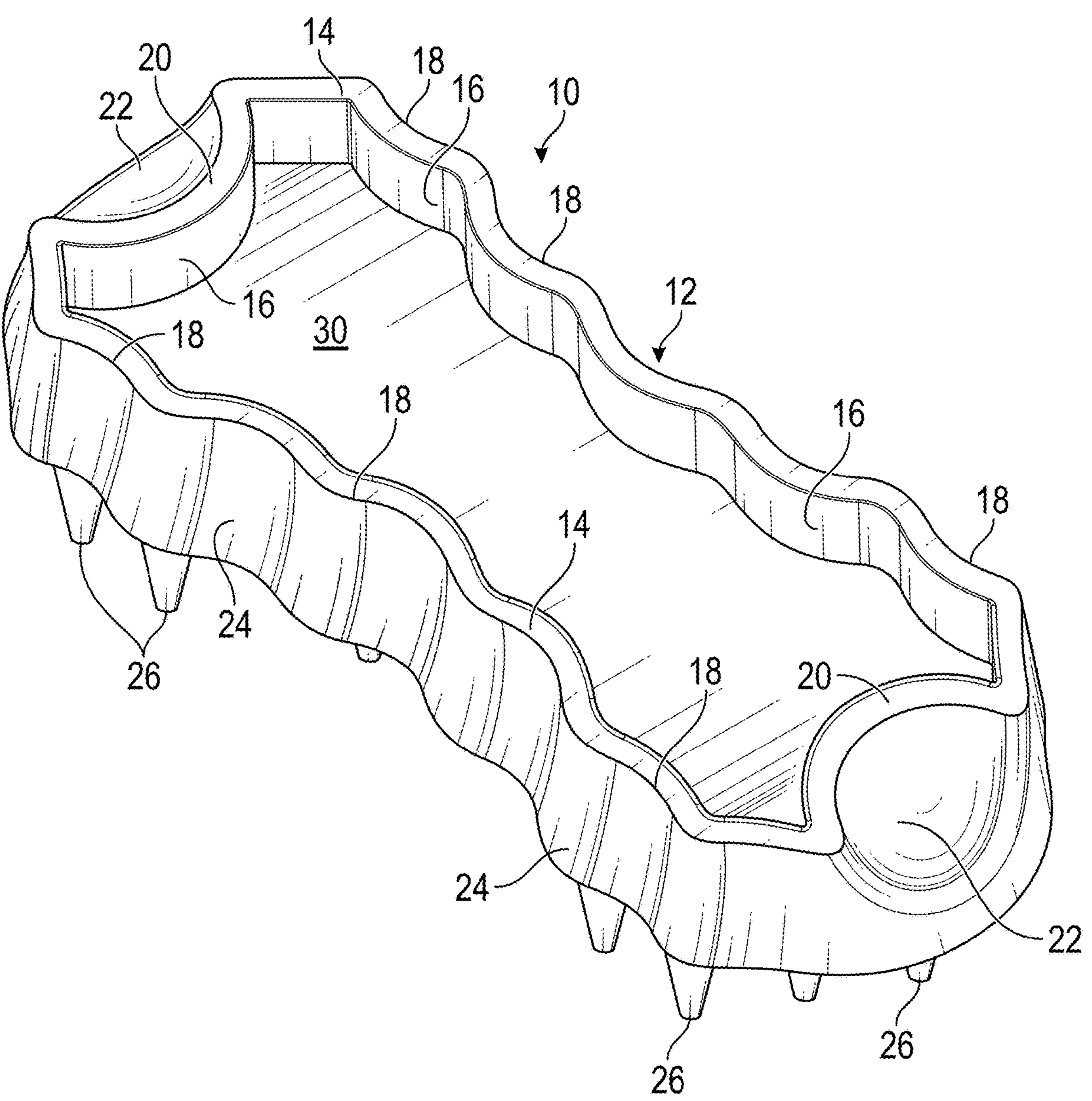
FIG. 1 is a top perspective view of the grooming device of the invention.

FIG. 1 is a top perspective view of the grooming device 10 of the invention according to one preferred embodiment of the invention. Referring also to the top plan view of FIG. 2, the grooming device includes a body 12 that is ergonomically shaped to fit within a user's hand. Conveniently, the body has a group of grooves or indentations 18 that are formed on the outer side edge of the body 12. As shown, there are five indentations 18 that are formed on each outer side edge of the body it being understood however that there can be fewer or a greater number of indentations. When grasping the device, the fingers can be placed on one outer side edge of the body, and the thumb can be placed on the opposite side edge. Each end of the device may also include a depression 22 that can be used to assist in gripping the end of the device in which the thumb or fingers may be placed within the depression 22. One should be able to appreciate that based upon the number of indentations 18 and depression 22, the device can be conveniently grasped by the user in various different orientations.

Figure 2:
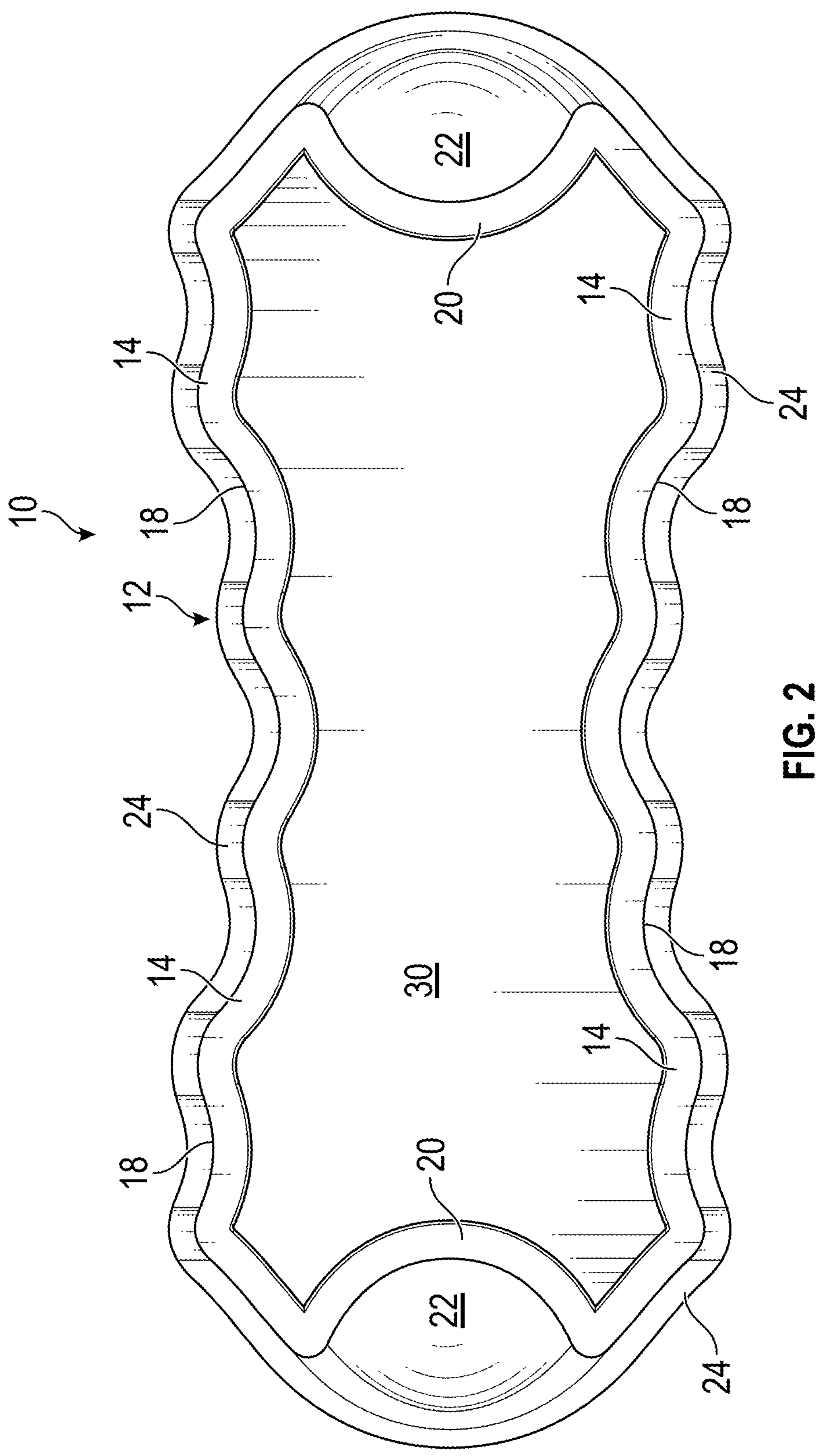
FIG. 2 is a top plan view of the grooming device.
Figure 3:
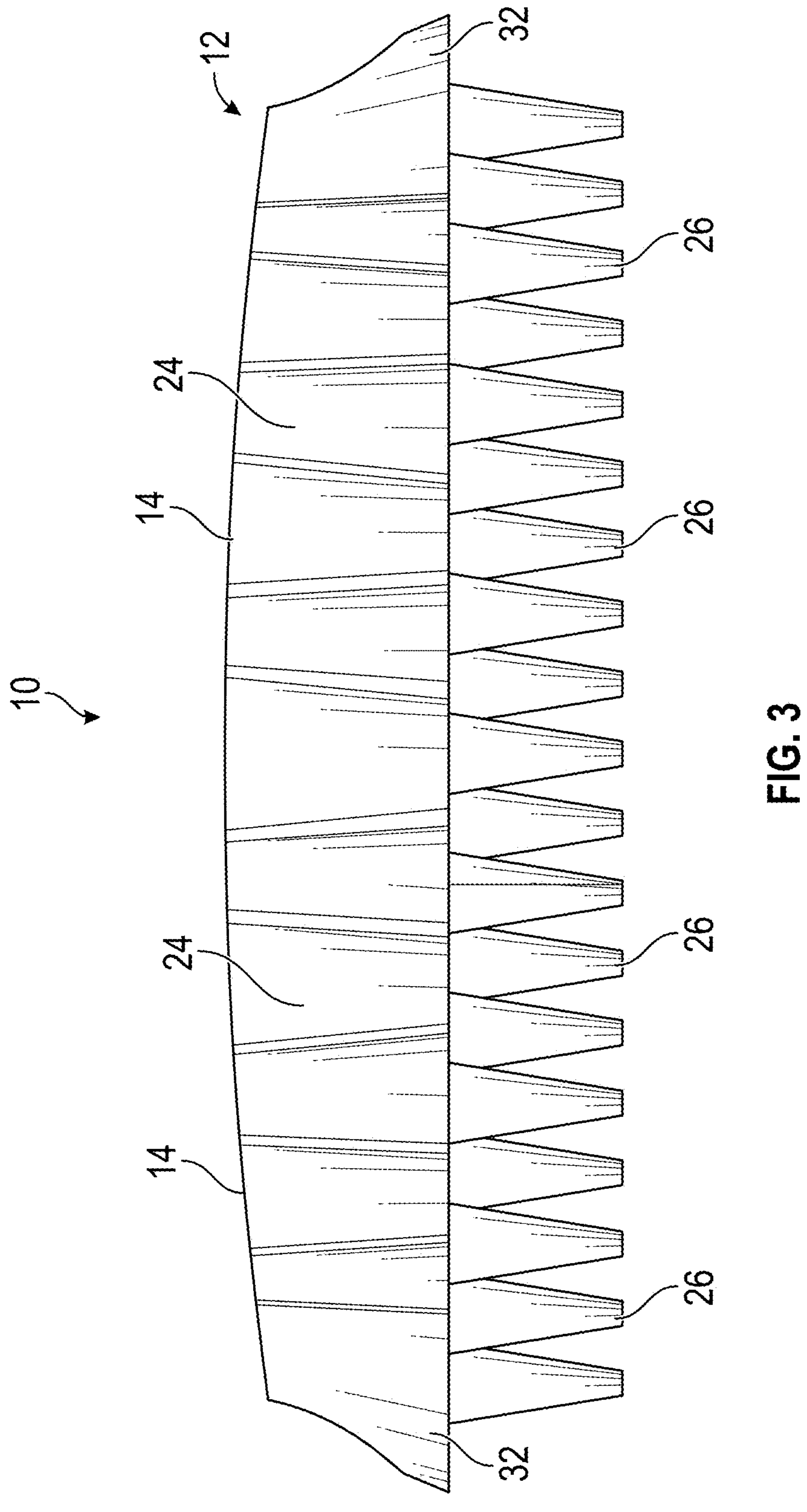
FIG. 3 is side elevation view of the grooming device.
Figures 4, 5:
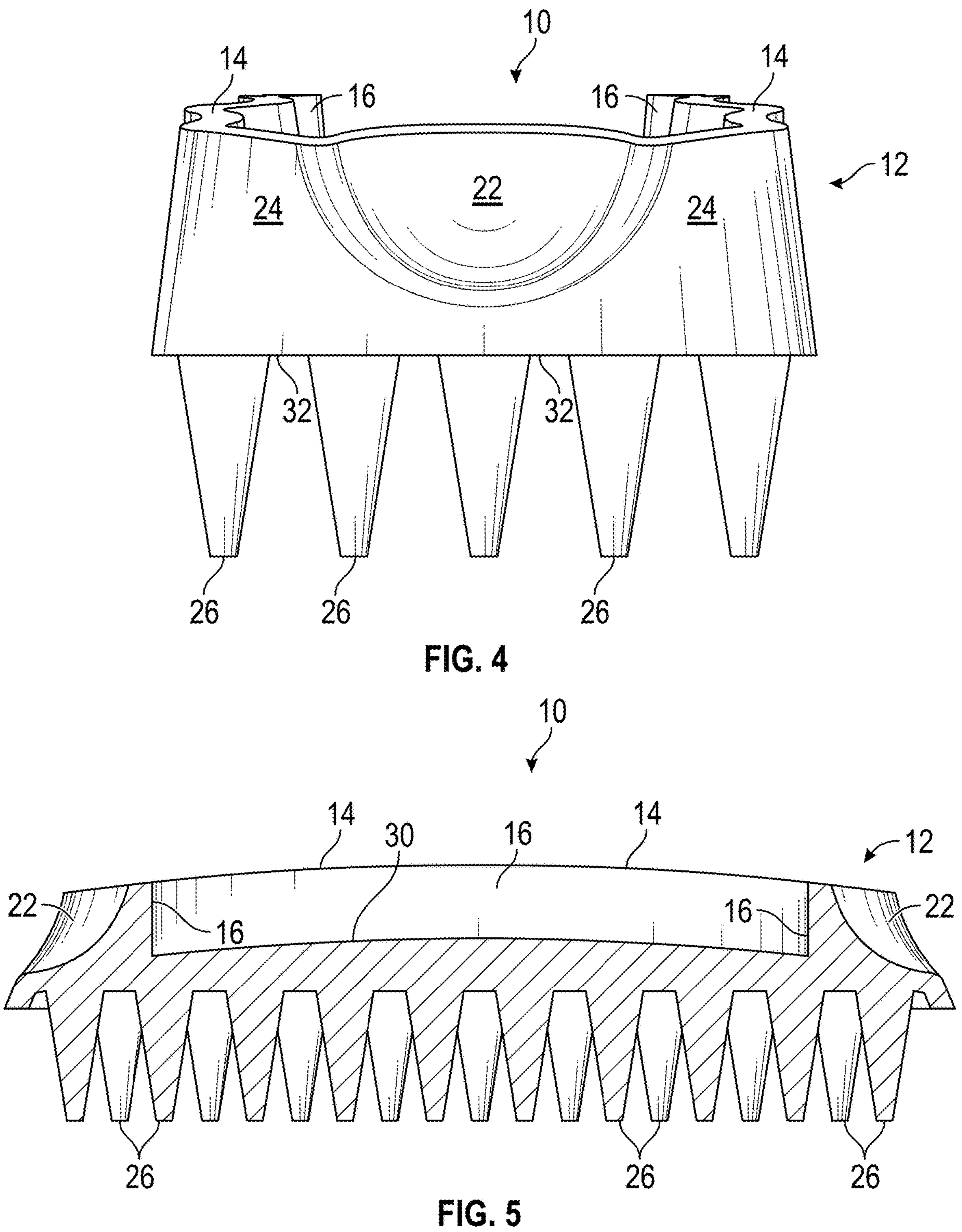
FIG. 4 is an end view of the grooming device.
FIG. 5 is a vertical section of the grooming device.
Figure 6:
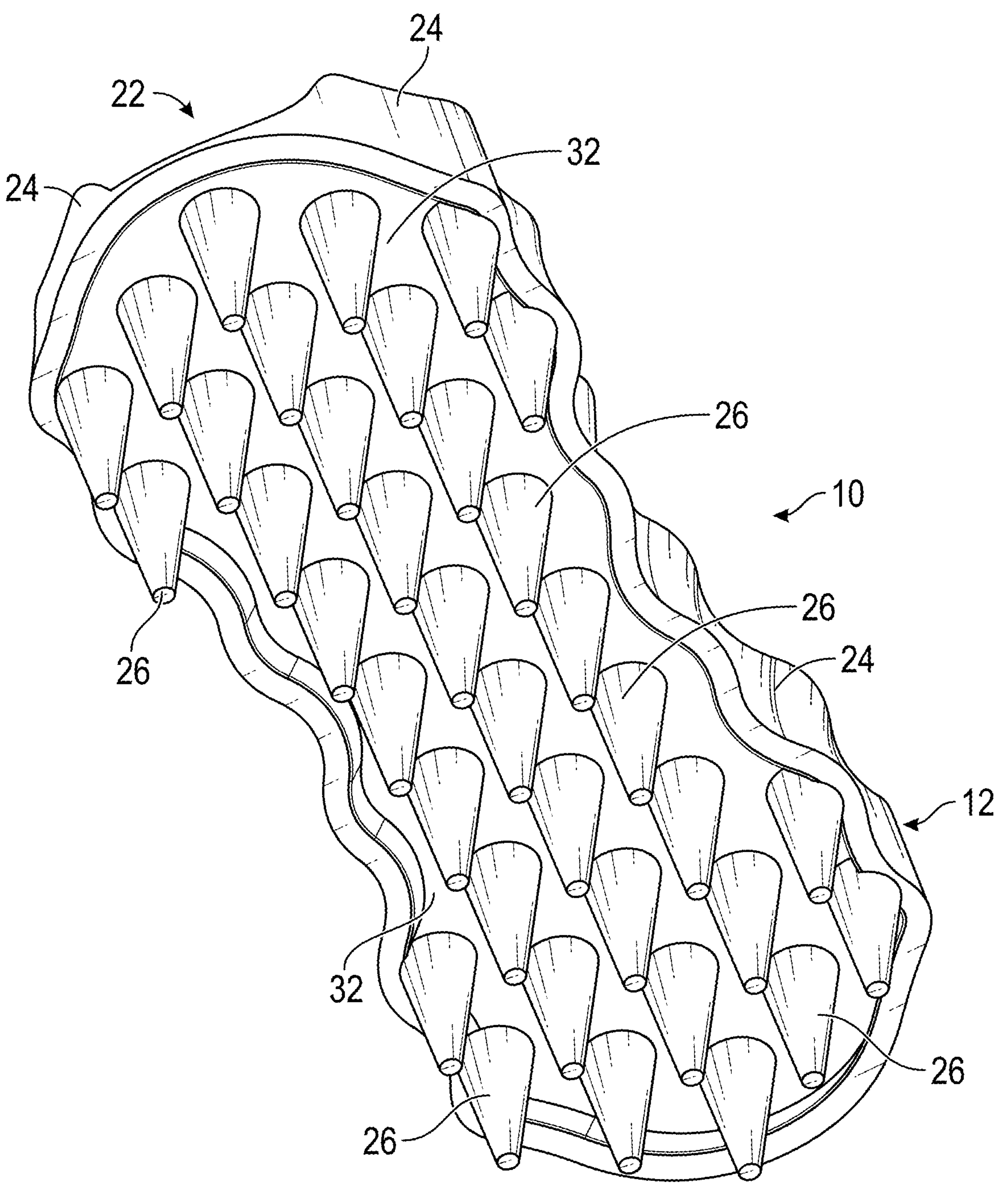
FIG. 6 is a bottom perspective view of the grooming device.

As also shown in FIGS. 1 and 2, the device 10 further includes an upper protruding or peripheral rim or wall 14. The peripheral wall extends continuously with the outer side edge 24 of the body 12 such that the peripheral wall extends above an upper surface 30 of the body. The peripheral wall 14 and the upper surface 30 form a reservoir or enclosure that has multiple functions. In one aspect, the peripheral wall can be considered simply as an extension of the outer side edge 24 such that the indentations 18 are formed continuously along the outer side edge 24 and the peripheral wall 14. The reservoir or enclosure can be defined as the gap or space within the upper surface 30 of the body and the protruding sidewall 16 of the peripheral rim 14.

Referring to FIGS. 3-6, other features of the invention are illustrated to include the grooming elements 26. As illustrated, the grooming elements 26 may have a truncated conical shape in which the larger end of the truncated cone connects to the lower surface 32 of the body. According to one aspect of the invention, the grooming elements can be flexible and elastomeric such that the grooming elements are capable of bending and otherwise deforming when the device is in use as the grooming elements contact the fur and skin of an animal. The grooming elements 26 are illustrated as being evenly spaced from one another along the lower surface 32 of the body. The grooming elements are also illustrated as being of similar sizes and shapes. However, it should be understood that the grooming elements can be irregularly spaced and can be of different sizes and shapes. For example, it may be advantageous to increase the density or number of grooming elements located at the ends of the grooming device in order to facilitate easier scrubbing or washing of smaller surface areas of the animal such as the lower legs and feet. Additionally, the relative stiffness or flexibility of the grooming elements may also differ from one another in order to accommodate a desired scrubbing action when the device is in use.

The device can be made of natural rubber, synthetic rubber, latex, PVC, or other types of thermoplastic materials. One consideration in selecting a material or a combination of materials is that the device should be relatively flexible so that it is easy for a user to grasp the device and to move the device along the curved body of an animal.

Figure 7:
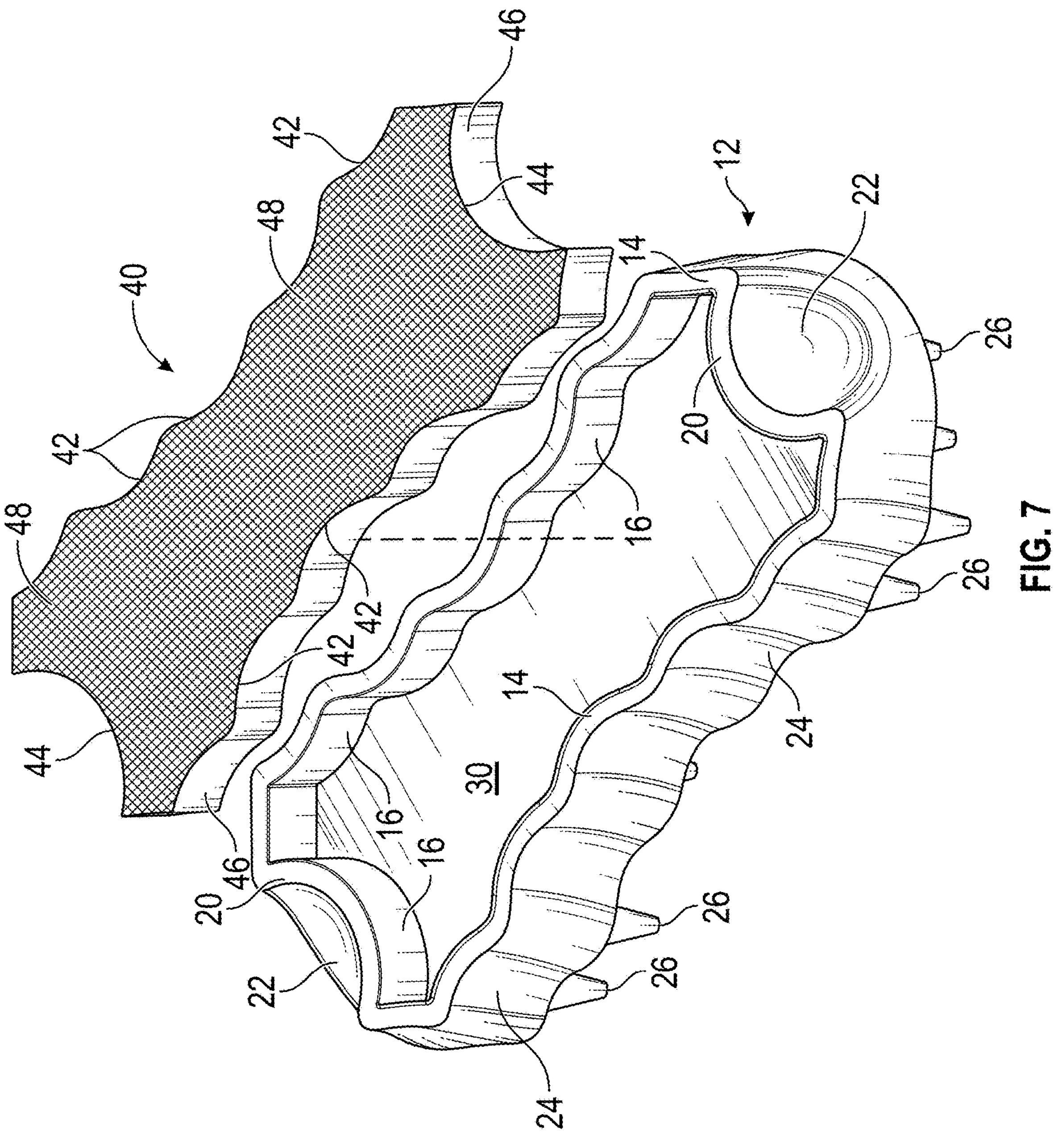
FIG. 7 is a top exploded perspective view of the grooming device of the invention in another embodiment that further includes the first absorbent pad or applicator.

FIG. 7 is a top exploded perspective view of the grooming device of the invention in another embodiment that further includes a first absorbent pad or first applicator 40. The first applicator 40 comprises a body 48 that has a plurality of grooves or indentations 42 that match the configuration of the indentations 18 of the body. The first applicator 40 may have a sidewall thickness 46 that approximately matches the height of the peripheral rim 14 such that an upper surface of the applicator pad 40 is substantially flush with the upper edge of the peripheral rim 14. As also shown, the applicator pad has larger curved indentation 44 in order to also match the configuration of the sidewall 16.

The first applicator 40 is intended to hold a quantity of material such as shampoo, conditioner, medications, pheromones, or other therapeutic materials that are intended to be applied to the fur and skin of the animal. The material can be directly applied to the applicator 40 in which the applicator is preferably made from an absorbent material such as a sponge. Additionally, the material intended to be applied to the animal can be placed within the reservoir and then the applicator 40 is slowly placed within the reservoir to absorb the material therein.

A user may place the applicator 40 in contact with the fur and skin of the animal to distribute and dispense the material onto the animal. The user may then flip the device over and contact the animal with the grooming elements in order to scrub or otherwise work the material into the fur and skin of the animal. The reservoir can be refilled with the material and/or the material can be directly applied to the applicator pad in order to supply additional material for contacting the animal.

The first applicator 40 may be made of a single material or may have multiple layers. For example, the upper exposed surface of the first applicator 40 may have a roughened texture as compared to the remaining part of the applicator 40 that could be made of an absorbent material such as a sponge. The roughened texture of the upper exposed surface can be used to more aggressively scrub and clean the animal as desired. If the roughened texture is not desired, the user can simply turn the applicator over such that the animal is only exposed to the softer sponge like material.

Figure 8:
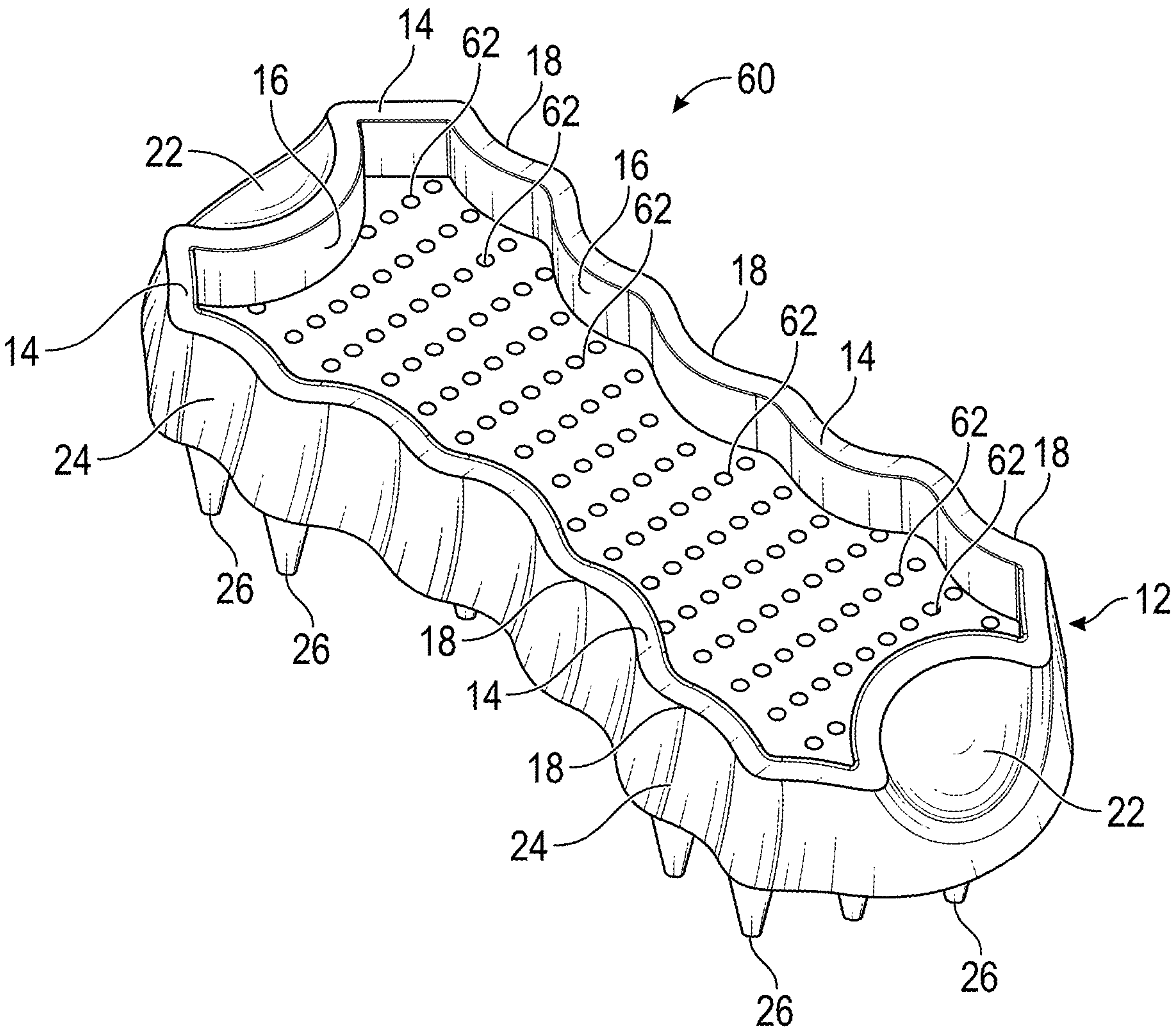
FIG. 8 is a top perspective view of the grooming device of the invention in yet another embodiment that further includes a plurality of dispensing passageways.
Figure 9:
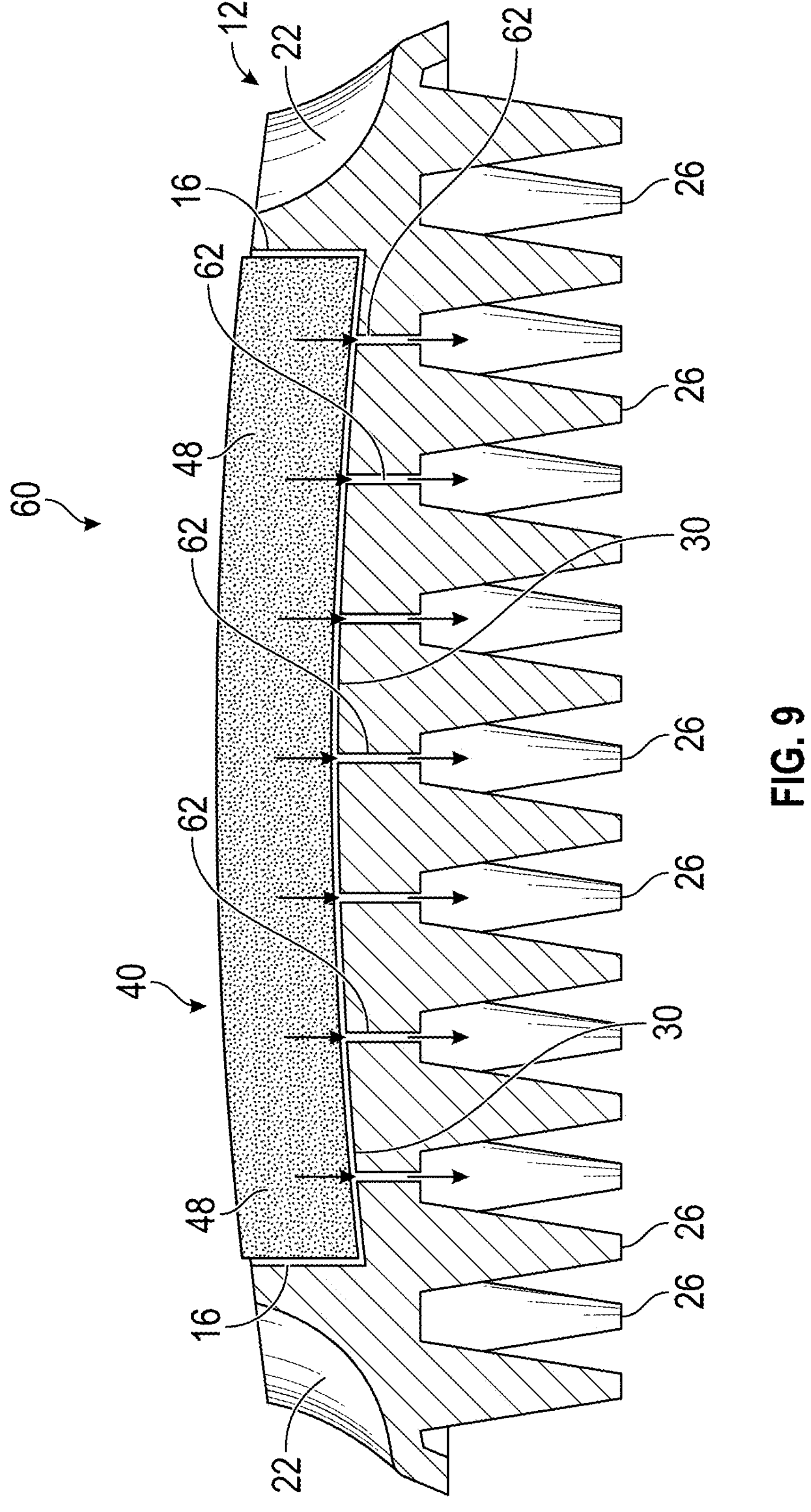
FIG. 9 is a vertical section of the grooming device of FIG. 8 and illustrating the first absorbent pad or applicator installed.

Referring to FIG. 8, this figure shows a top perspective view of the grooming device of the invention 60 in yet another embodiment that further includes a plurality of dispensing passageways 62. FIG. 9 is a vertical section of the grooming device of FIG. 8 also illustrating the first absorbent pad or applicator installed. Another way in which therapeutic material can be selectively dispensed onto the animal is by the passageways 62 that extend through the body 12. The plurality of passageways 62 are oriented substantially vertical according to the view in FIG. 9 such that material can easily flow through the passageways 62 to the lower surface 32 of the body and adjacent the points where the grooming elements 26 attached to the body. Directional arrows are provided in FIG. 9 to show how the material can be dispensed from within the applicator 40 and through the passageways 62. The size, distribution, and number of passageways can be adjusted to selectively meter a desired quantity of material within the reservoir and applicator 40.

Figure 10:
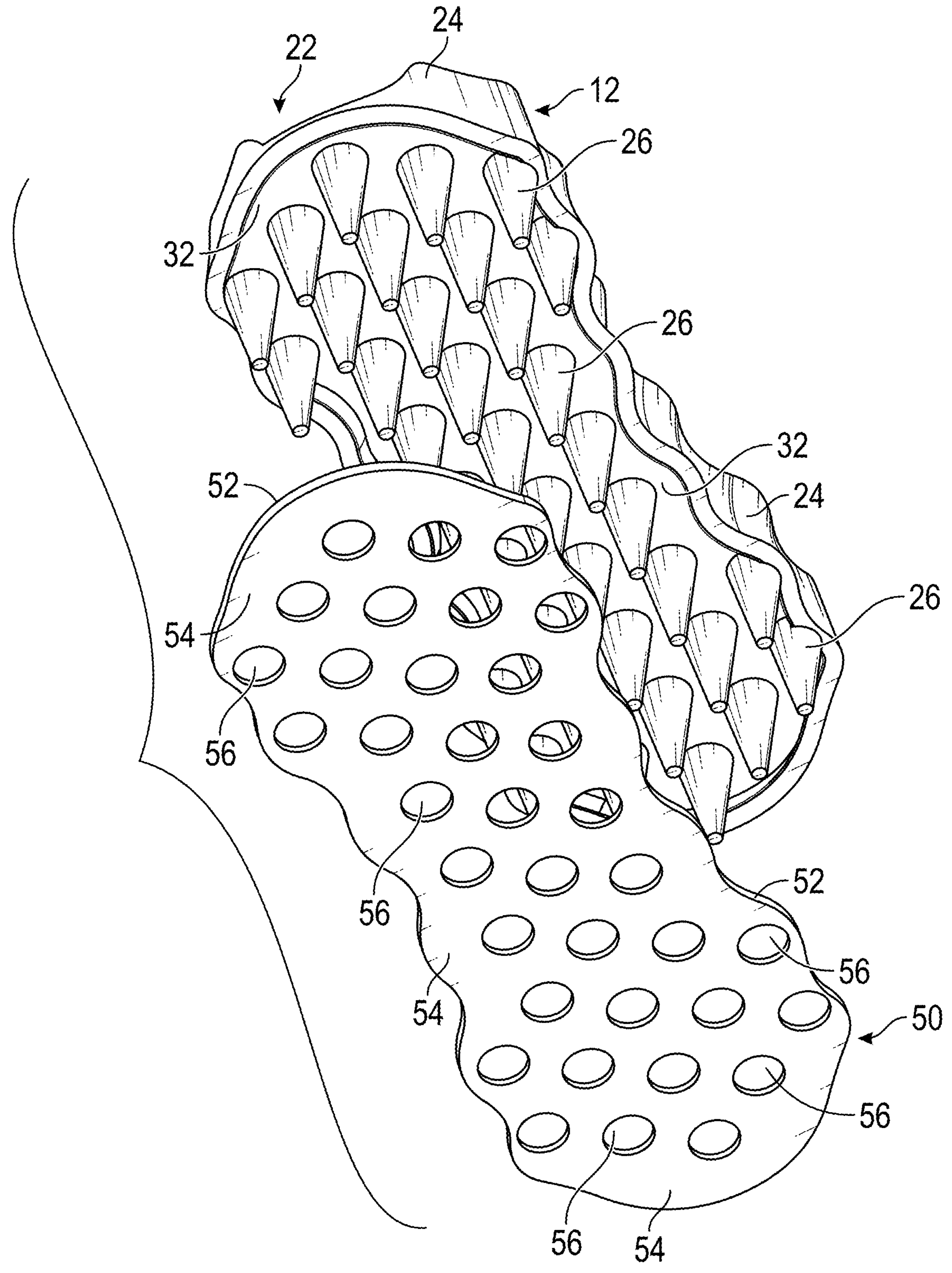
FIG. 10 is a bottom perspective view of the grooming device in yet another embodiment showing the second absorbent pad or applicator.
Figure 11:
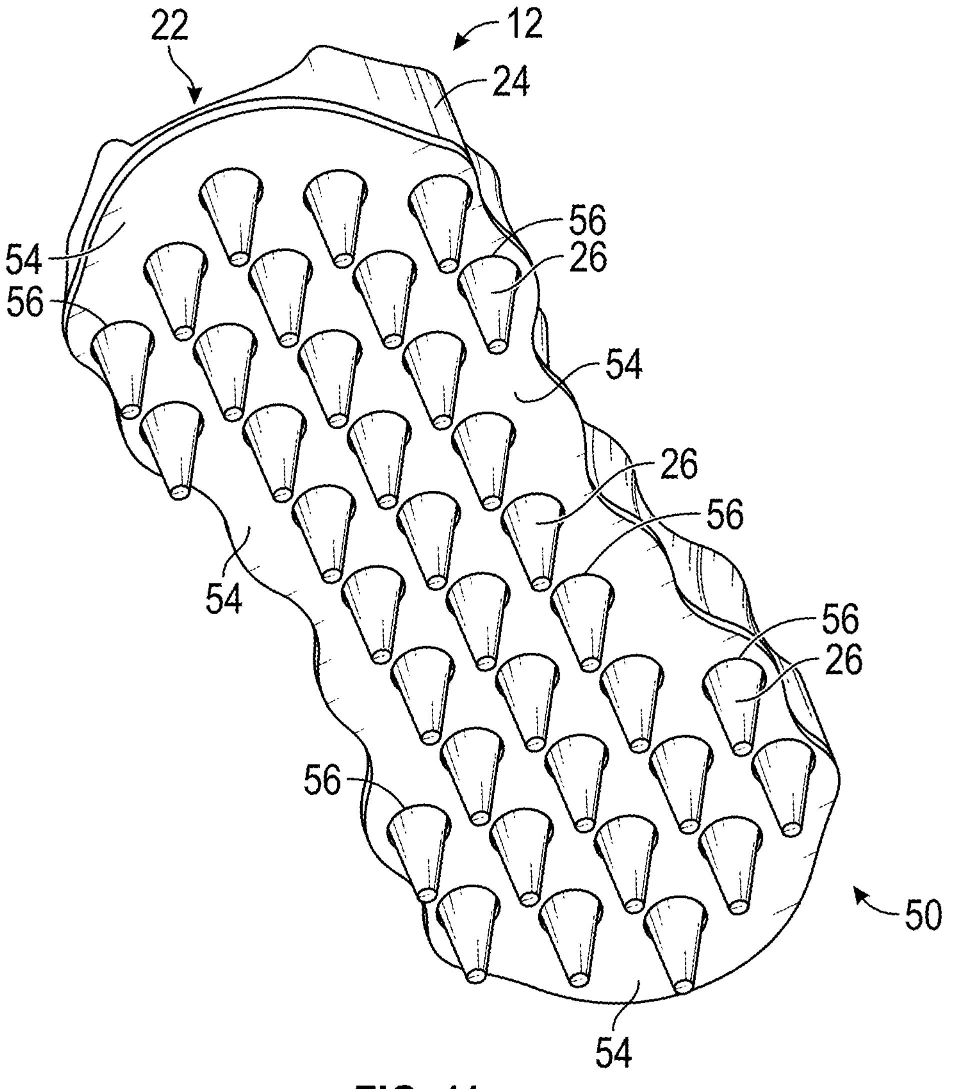
FIG. 11 is a bottom perspective view of the grooming device of FIG. 10 showing the second absorbent pad or applicator installed.

FIG. 10 is a bottom perspective view of the grooming device in yet another embodiment of the invention showing a second absorbent pad or applicator 50. FIG. 11 is a bottom perspective view of the grooming device of FIG. 10 showing the second absorbent pad or applicator 50 installed. The second applicator 50 has a body 54 with a plurality of openings formed therethrough that are sized and configured to receive the grooming elements 26. The second applicator 50 is shown as having a relatively thin sidewall 52 as compared to the thickness of the first applicator 40. According to one configuration, as shown in FIG. 11, the openings 56 can be sized and spaced such that the second applicator 50 can be placed substantially flush against the lower surface 32 of the body. Further, the size of the openings 56 can be made such that there is a frictional fit between the openings and the grooming elements thereby keeping the second applicator 50 secured in place during use. The second applicator 50 has many potential functions. One function could be to apply a finishing therapeutic material after the animal has been shampooed and conditioned, such as applying a pleasant, scented material or pheromone. Another function could be to provide increased retention of material to be applied to the animal which therefore may slow the dispensing of the material onto the animal. For example, if the device to be used includes the passageways 62, the second applicator 50 may be useful in metering the amount of the material being applied by slowing the flow of material through the passageways. The second applicator can also be made of a desired absorbent or semi-absorbent material depending upon how the second applicator is to be used.

Figure 12:
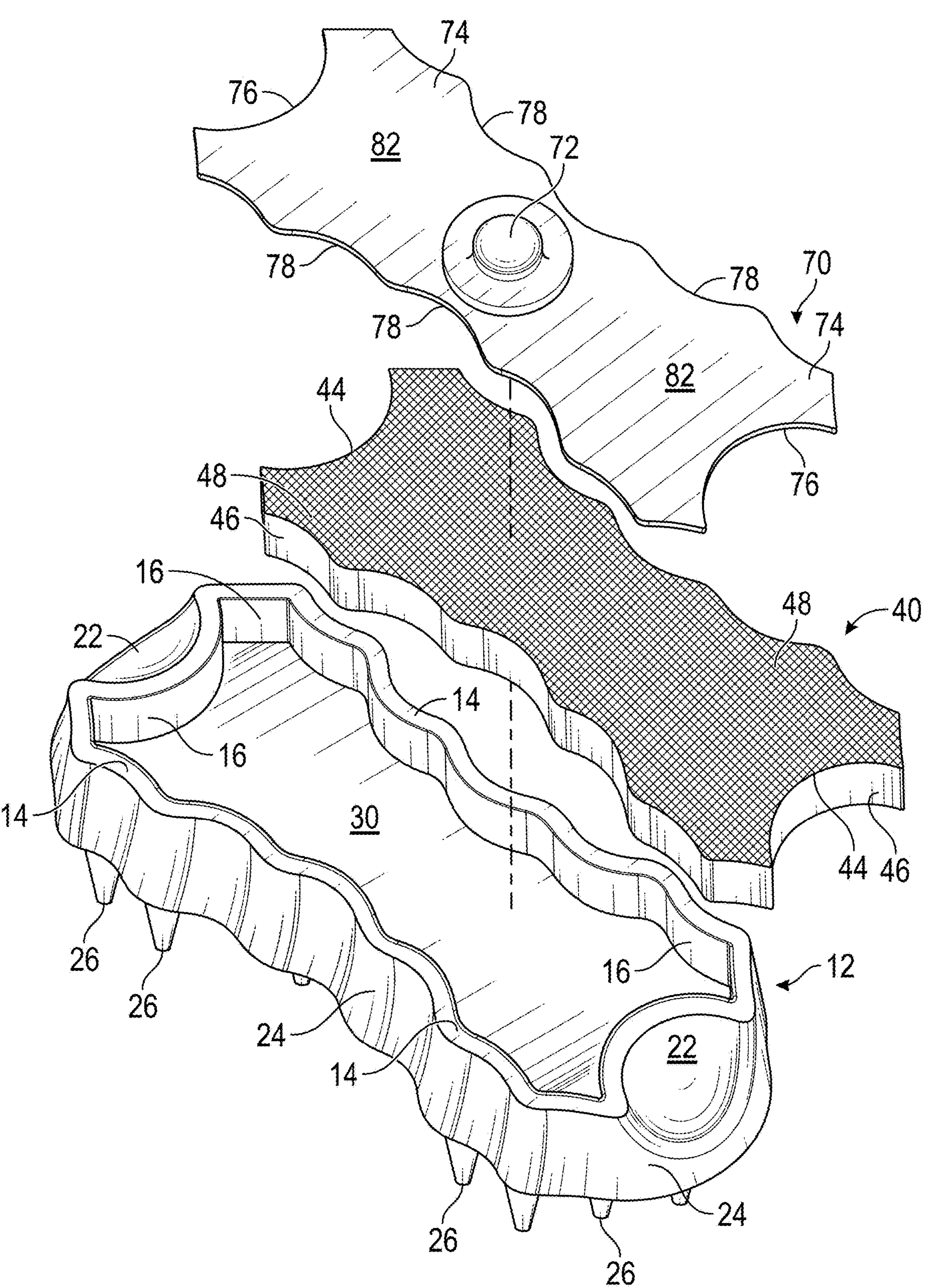
FIG. 12 is a top exploded perspective view of the grooming device of the invention in yet another embodiment that further includes the first absorbent pad or applicator and a pressure cover.
Figure 13:
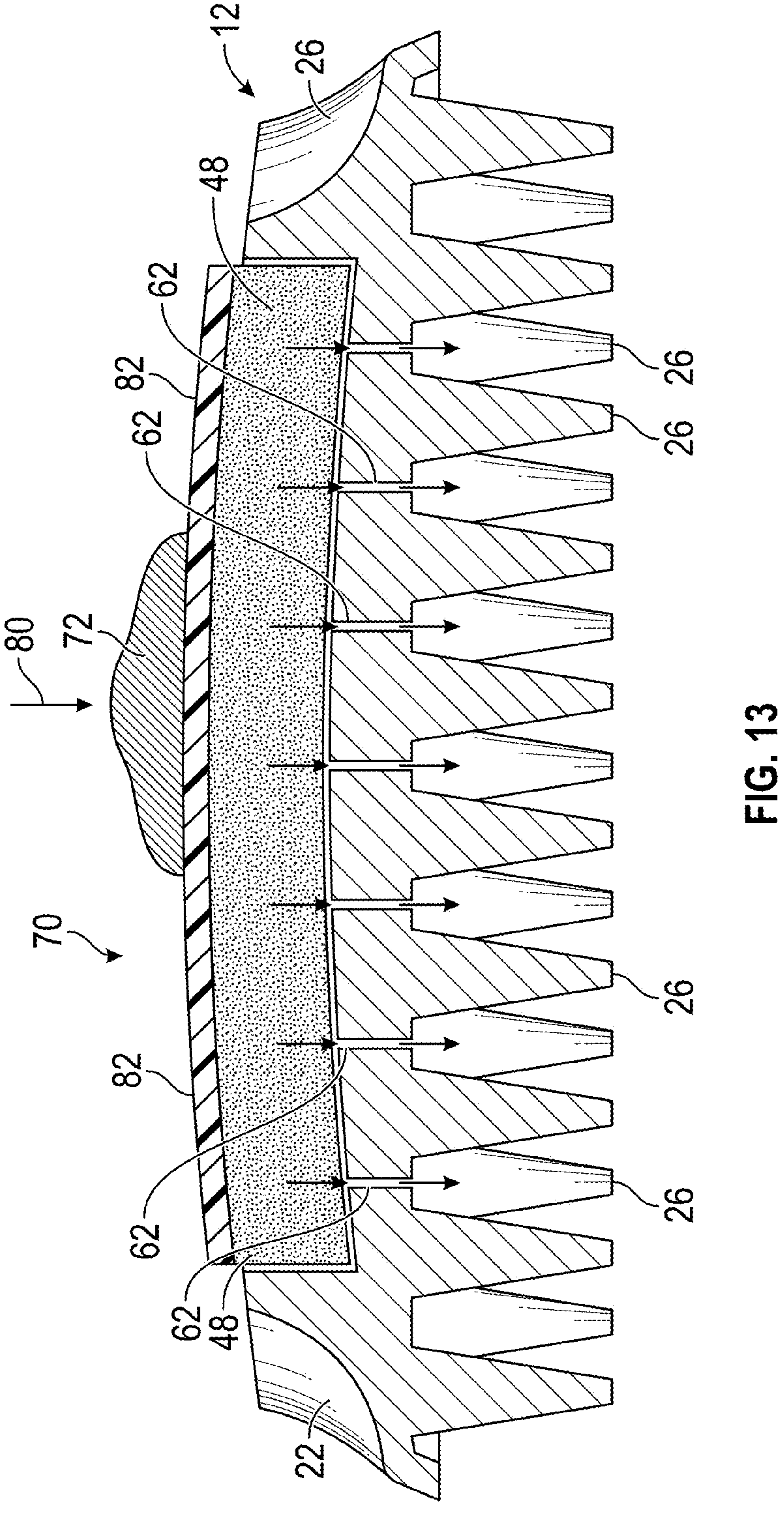
FIG. 13 is a vertical section of the grooming device of FIG. 12 and illustrating the first absorbent pad or applicator and pressure cover installed.

FIG. 12 is a top exploded perspective view of the grooming device of the invention in yet another embodiment that further includes the first absorbent pad or applicator 40 and a pressure cover 70. FIG. 13 is a vertical section of the grooming device of FIG. 12 showing the first absorbent pad or applicator 40 and pressure cover 70 installed. The purpose of the pressure cover 70 is to assist a user in applying pressure to the first applicator 40 in order to selectively deliver a quantity of the therapeutic material through the passageways 62. The pressure cover 70 has a body 74 and a plurality of indentations 78 that match the configurations of the indentations formed on applicator pad 40 and body 12. A grip point 72 may be added to the exposed surface 82 of the cover 70 so that the user can place the fingers or the palm of the hand against the cover 70 in order to apply pressure to the cover 70.

The pressure cover 70 preferably is preferably made of a relatively stiff material such that when a user grasps the grip point 72 and exerts pressure against the cover 70 in the direction of arrow 80, relatively even pressure is transferred across the entire upper surface of the applicator 40 in contact with the pressure cover.

Figure 14:
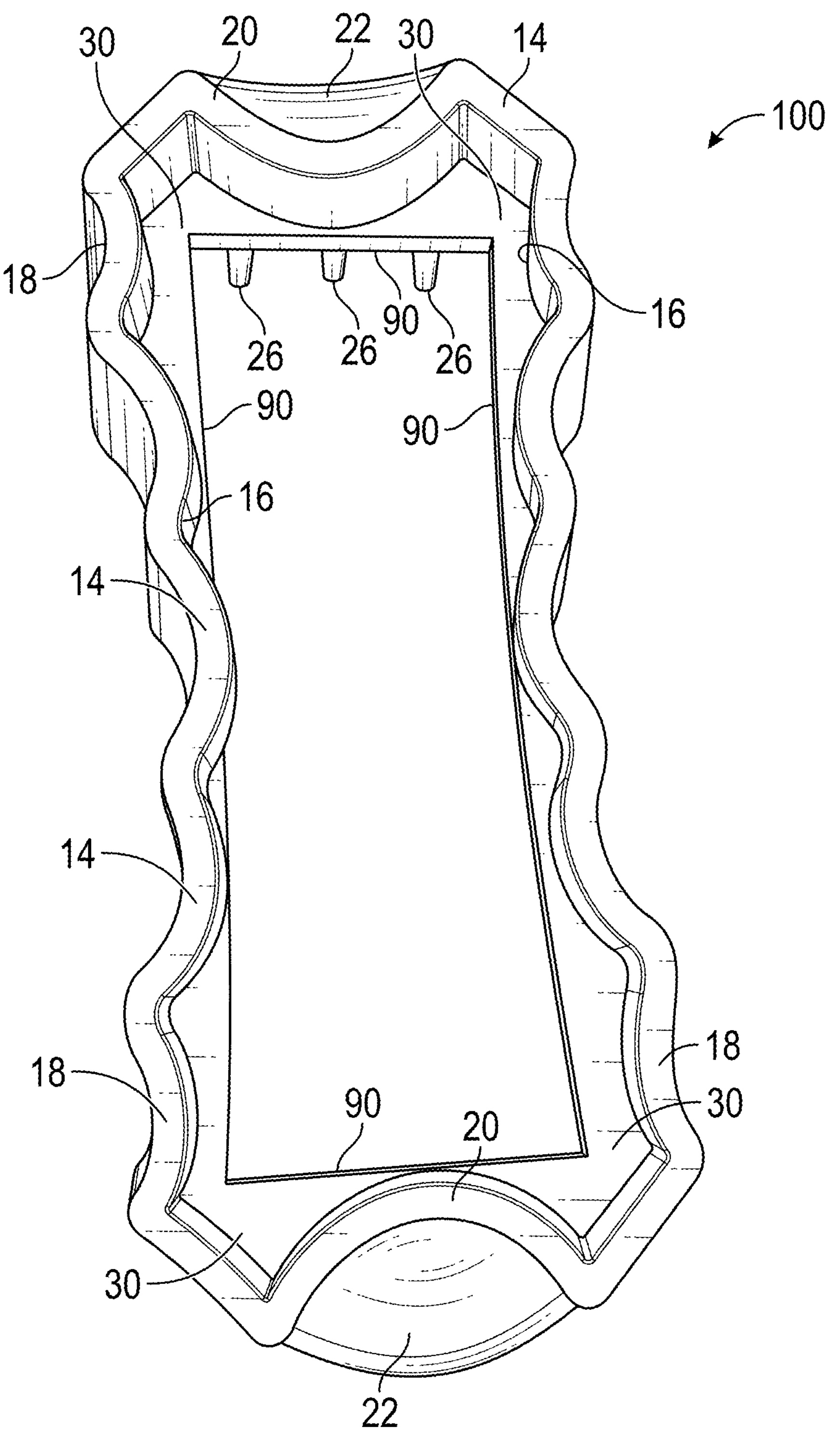
FIG. 14 is a top perspective view of the grooming device of the invention in another embodiment in which a large opening is made in the body of the device to hold an absorbent pad or applicator.

FIG. 14 is a top perspective view of the grooming device of the invention in another embodiment in which a large central opening is made in the body of the device to hold an absorbent pad or applicator. The same reference numerals are used in the FIGS. 14-22 to denote the same structural elements as found in the previous embodiments. The changes in the embodiment of FIGS. 14 through 22 include a large central opening delimited by side edges 90 shown in FIG. 14. As shown in this figure, the large central opening encompasses a majority of the area of the body in which what remains for the body is a portion of the body adjacent to the upper protruding or peripheral rim or wall 14. Accordingly, as best seen in FIG. 16, many of the grooming elements 26 are removed except for the most outlying group of grooming elements located along the periphery of the body.

Figure 15:
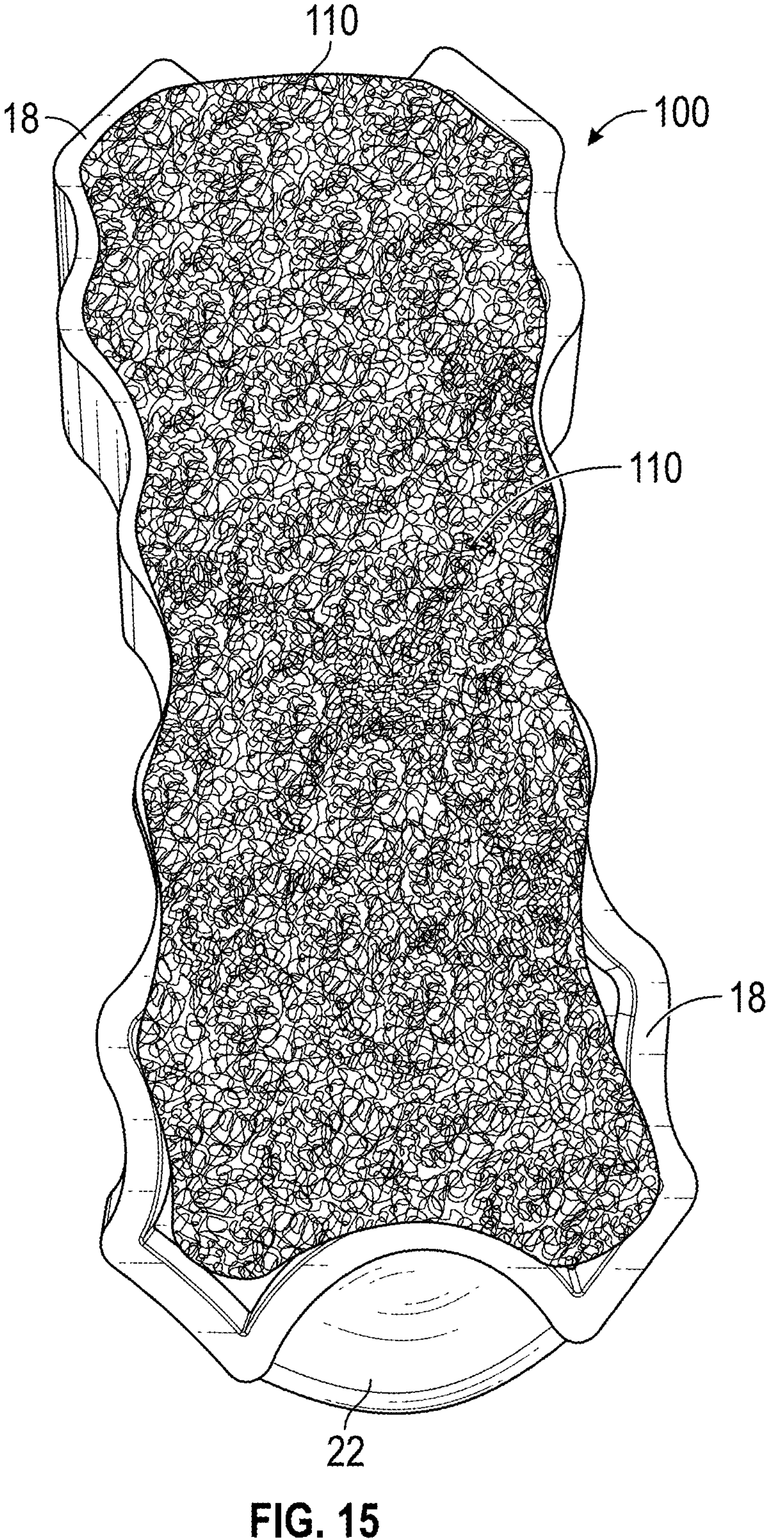
FIG. 15 is a top perspective view of FIG. 14 with an absorbent pad or applicator
Figure 16:
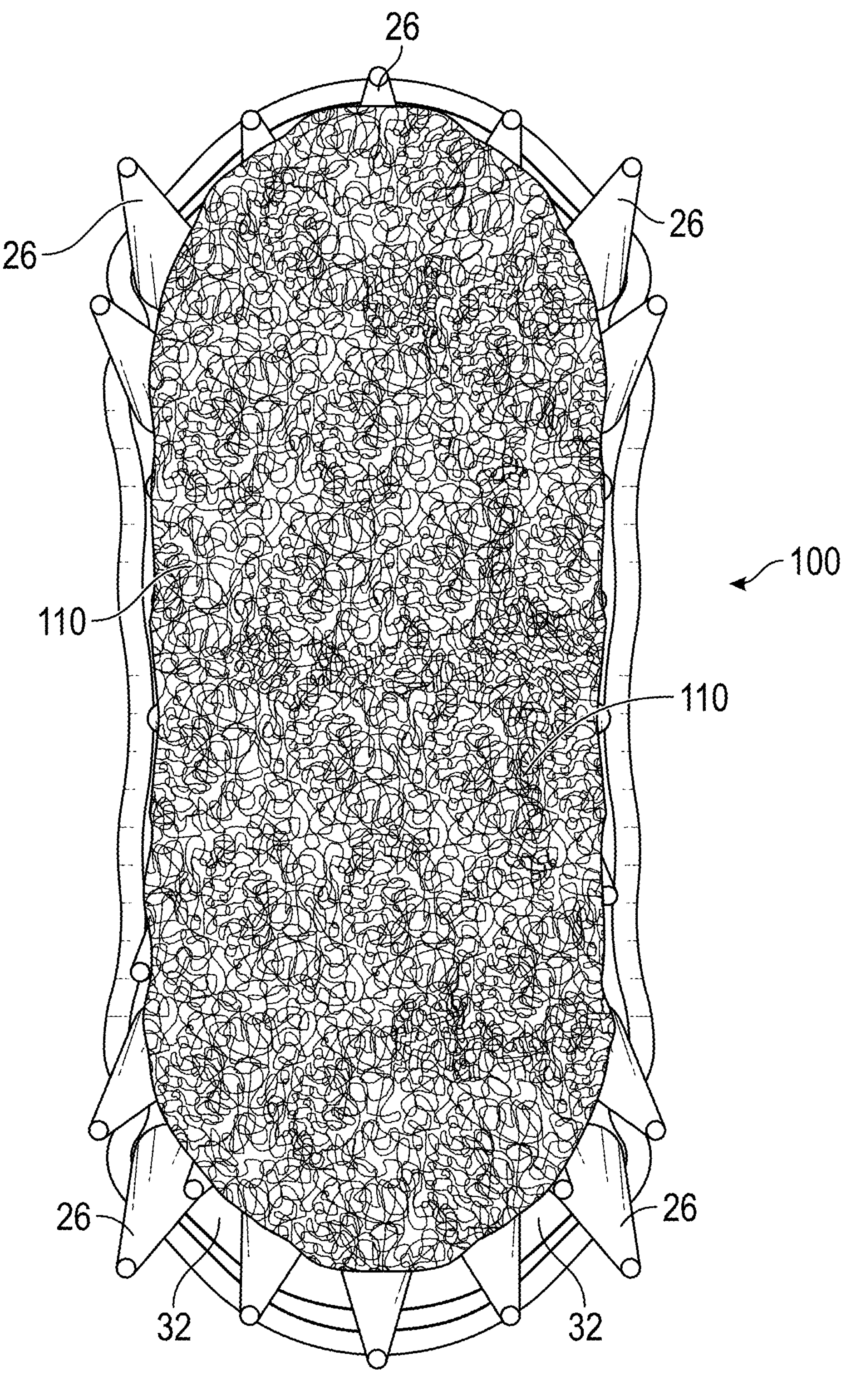
FIG. 16 is a bottom perspective view of the grooming device of FIG. 15

The large central opening is especially adapted to receive an applicator 110 as shown in FIG. 15. The applicator 110 in FIG. 15 is shown as nearly completely filling the gap or space between the interior sidewalls 16. The sidewalls 16 and the remaining portions of the body can still be described as an enclosure which provides enough surface area on the upper surface 30 of the body to support the applicator 110 as illustrated.

Figure 17:
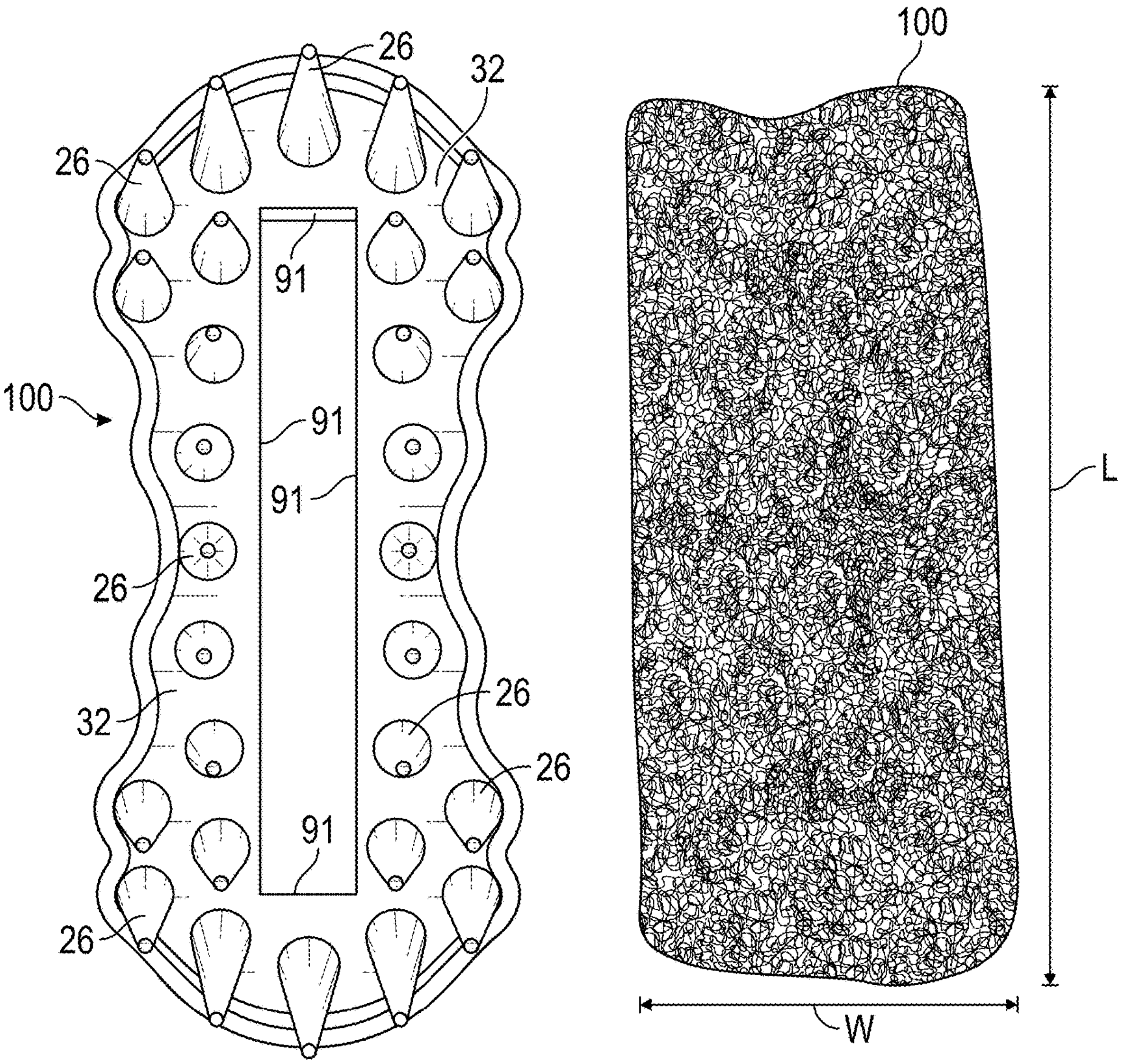
FIG. 17 is a top perspective view of the grooming device of FIG. 14 in which the size of the opening in the body is smaller, and the absorbent pad or applicator is illustrated with a length and width that is larger than the opening in the body.

FIG. 17 is a bottom perspective view of the grooming device of FIG. 14 in which the size of the opening in the body is smaller as defined by the side edges 91, and the absorbent pad or applicator is illustrated with a length L and width W that is larger than the opening in the body.

Figure 18:
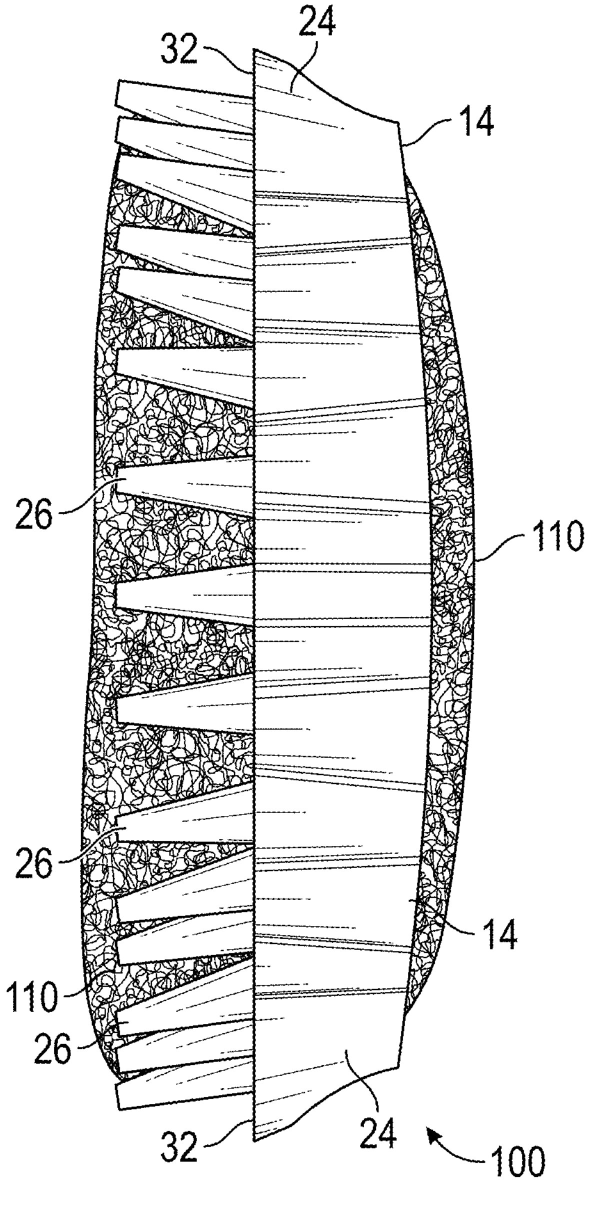
FIG. 18 is a side elevation view of the device of FIG. 17 in which the absorbent pad or applicator is placed in the opening such that the length of the absorbent pad or applicator is oriented with the long side of the opening, and further illustrating that the absorbent pad or applicator extends above the top edge of the device and below the grooming elements.

FIG. 18 is a side elevation view of the device of FIG. 17 in which the absorbent pad or applicator is placed in the opening such that the length of the absorbent pad or applicator L is oriented with the long side of the opening and further illustrating that the absorbent pad or applicator extends above the top edge of the device and below the tips or ends of the grooming elements.

Figure 19:
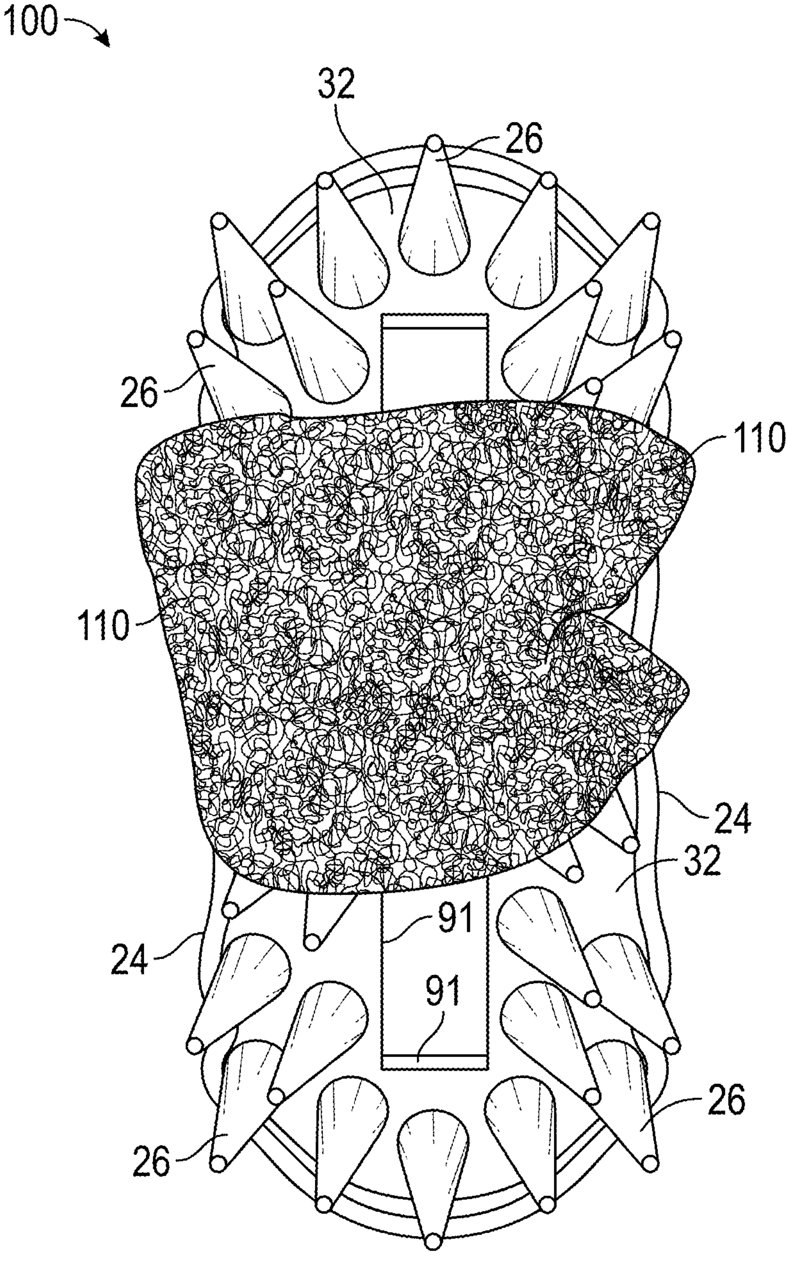
FIG. 19 is a bottom perspective view of the grooming device of FIG. 17 in which the absorbent pad or applicator is placed in the opening such that the length of the absorbent pad or applicator is oriented perpendicular with the opening, and the absorbent pad or applicator is folded or bunched so that the absorbent pad or applicator can fit through the opening.

FIG. 19 is a bottom perspective view of the grooming device of FIG. 17 in which the absorbent pad or applicator is placed in the opening such that the length of the absorbent pad or applicator is oriented perpendicular with the opening, and the absorbent pad or applicator is folded or bunched so that the absorbent pad or applicator can fit through the opening.

Figure 20:
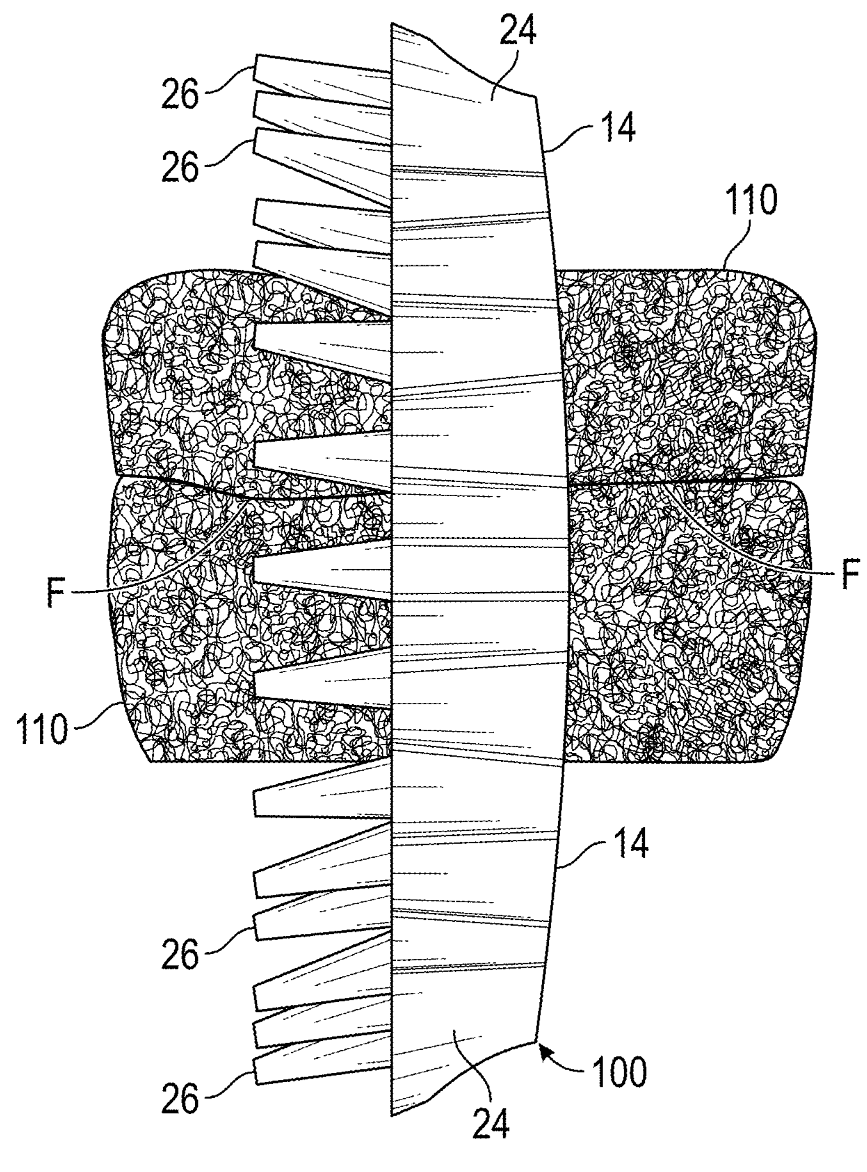
FIG. 20 is a side elevation view of the device of FIG. 19 in which the absorbent pad or applicator is placed in the opening and showing that the absorbent pad or applicator that extends higher above and lower below the device as compared to the orientation of the absorbent pad or applicator shown in FIG. 18. This figure also shows the absorbent pad being folded or deformed so that it can fit within the opening, noting the fold or deformation adds to the stiffness of the absorbent pad is some areas.

FIG. 20 is a side elevation view of the device of FIG. 19 in which the absorbent pad or applicator is placed in the opening and showing that the absorbent pad or applicator extending higher above and lower below the device as compared to the orientation of the absorbent pad or applicator shown in FIG. 18. FIG. 20 also shows a fold F in the applicator 110 which may be required to fit the applicator through the opening in the body. Folding the applicator 110 may itself have several advantages. One advantage is that the applicator density is increased at the areas around the fold F which may facilitate a greater scrubbing or cleaning action as applied to the animal. Another advantage is that the fold F may help to retain the applicator so that vigorous scrubbing by the user will not cause the applicator to be dislodged from the device. Another advantage is that the size of the applicator can be increased since the applicator is folded, which enables the applicator to hold more therapeutic material therein.

Figure 21:
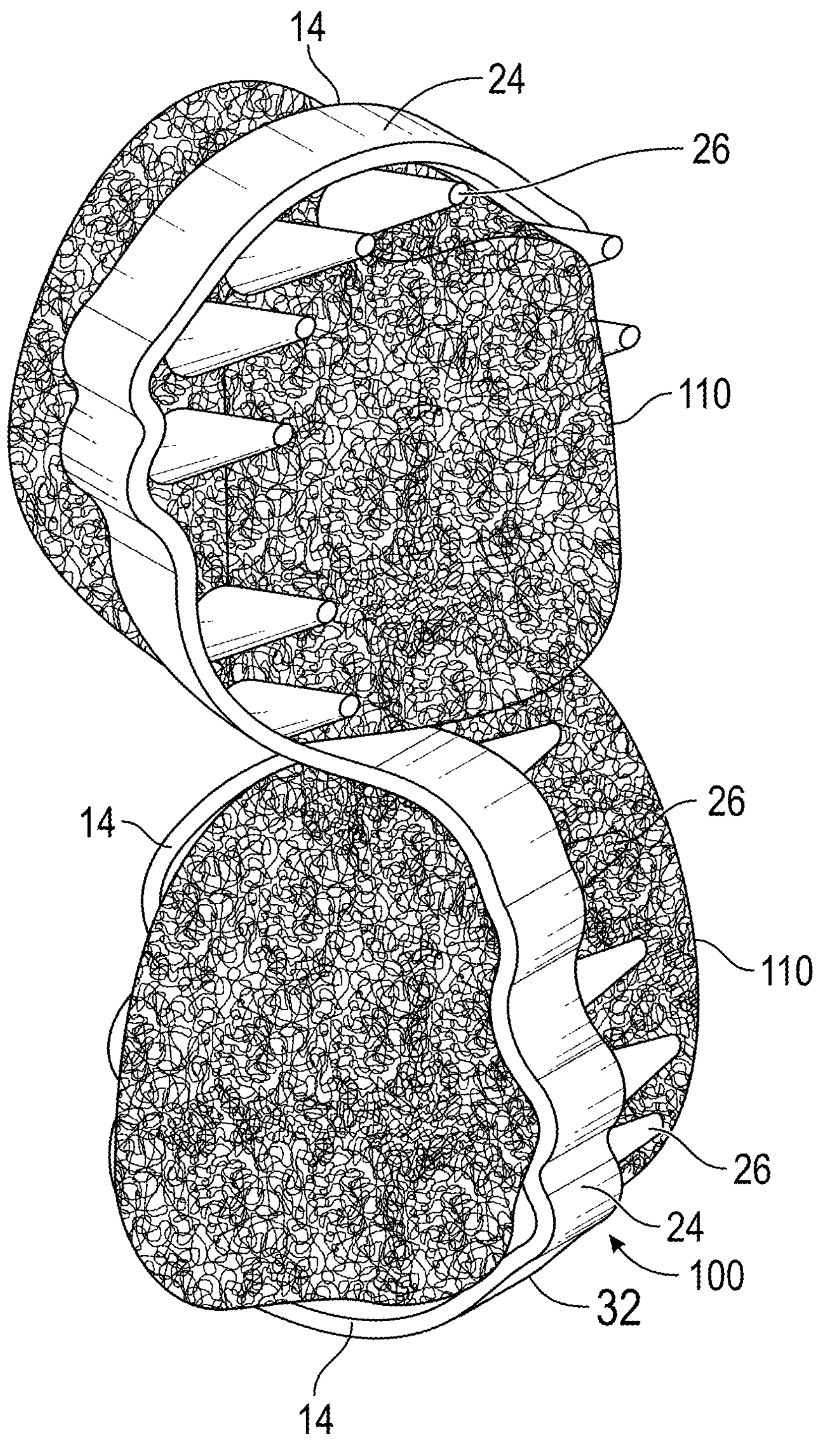
FIG. 21 is a perspective view of the embodiment in FIG. 18 showing the body of the device being twisted resulting in the applicator pad being wrung out to change the amount and rate at which the therapeutic material is released from the applicator pad.

FIG. 21 is a perspective view of the embodiment in FIG. 18 showing the body of the device being twisted resulting in the applicator pad being wrung out to change the amount and rate at which the therapeutic material is released from the applicator pad. Alternatively, the twisting action can facilitate removing therapeutic material from the applicator if the device is no longer in use, or if the applicator is to subsequently receive another type of therapeutic material. Because the body of the device is flexible and elastomeric, the twisting action can be achieved without having to remove the applicator which adds convenience for use of the device with integral applicator. It can be particularly noted in this figure that the twisting of the device results in approximately one half of the device being rotated approximately 180 degrees. The twisting of the device in this figure is intended to represent that the body of the device has great flexibility and elasticity such that the applicator can be wrung out to remove a significant portion of the therapeutic material in the applicator or wrung out in increments so that the desired amount of therapeutic material is discharged as controlled by the user.

Figure 22:
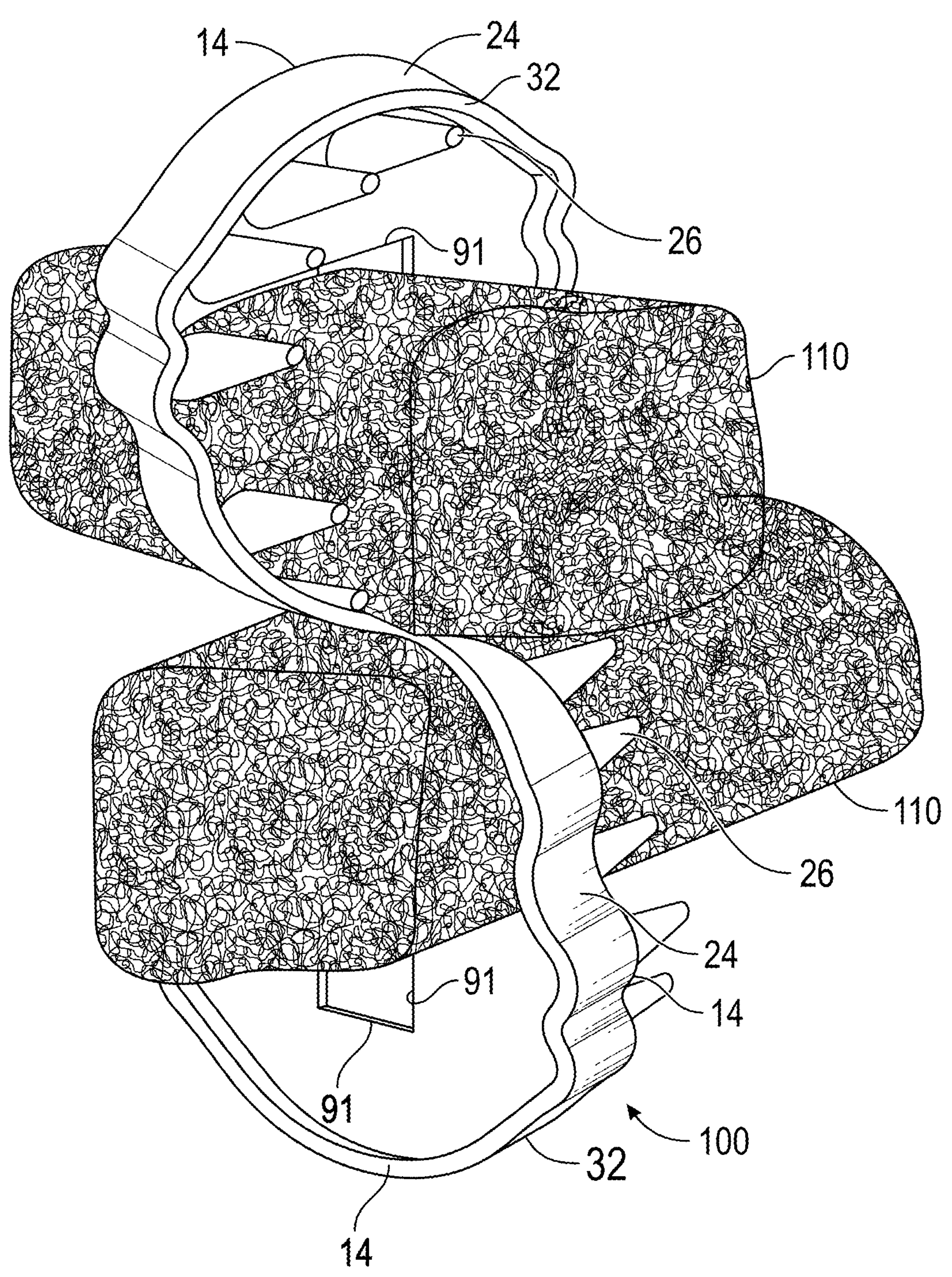
FIG. 22 is a perspective view of the embodiment in FIG. 20 showing the body of the device being twisted resulting in the applicator pad being wrung out to change the amount and rate at which the therapeutic material is released from the applicator pad.

FIG. 22 is a perspective view of the embodiment in FIG. 20 showing the body of the device being twisted resulting in the applicator pad being wrung out to change the amount and rate at which the therapeutic material is released from the applicator pad. The same attributes for the device described above in FIG. 21 apply to the device shown in FIG. 22. The flexible and elastic composition of the body enables incremental and controlled discharge of therapeutic material.

According to the embodiment of FIGS. 21 and 22, a few features of the invention should be apparent. The body can be twisted so to increase a density of the applicator in areas of the applicator that become twisted. The body can be twisted in an angular range of between about 1-180 degrees. The body is capable of being stretched such that the body stretches substantially uniformly along areas where the body is twisted due to the elasticity of the body.

Each of the embodiments disclosed can be made of flexible and elastomeric materials that are best suited for deforming or stretching in order to firmly hold various sized applicators. One ordinary form of an applicator may include a sponge or similar sponge like material. A sponge as this term is used herein is described as a piece of soft, porous material, either natural or synthetic, that is capable of absorbing liquids and can be compressed or deformed to release the liquid within the sponge when the sponge is squeezed or otherwise deformed. As mentioned, the grooves/indentations and depressions formed on the body of the grooming device are intended to provide an ergonomic configuration that is easily grasped and held by the user so that the grooming device can be moved in any desired direction.

The embodiment in FIGS. 14-22 have many additional functions and advantages. The grooming elements in this embodiment may be described more functionally as scrubbing fingers that are used to scrub the animal as opposed to grooming. The scrubbing fingers can be of assorted sizes and lengths to accommodate the particular size of sponges that may be used with the device. For long haired dogs and cats, the scrubbing fingers may have an extended length which enables the scrubbing fingers to more easily penetrate all layers of the animals fur. As also mentioned, the applicators may hold a variety of different cleansing materials such as soaps, shampoos, conditioners, etc. After use, the applicator can simply be rinsed and wrung out to remove remaining cleansing materials remaining in the applicator.

As compared to the previous embodiments, the embodiment of. FIGS. 14-22 may provide a more effective washing or cleaning device, particularly for a simple sponge-type bath as opposed to a more intense showering of an animal that may be experienced at a professional groomer. For example, for daily cleaning of an animal in which it may not be necessary to conduct a thorough washing or cleaning, this embodiment is ideal because it simply involves adding water and the desired cleaning solution to the sponge, applying the sponge to the animal, and then rinsing the animal. The daily cleaning of the animal could simply include use of the device without rinsing the animal as well. The flexible, elastomeric and ergonomic configuration of the body of the device allows a user's hand to easily manipulate the sponge and at the same time, the scrubbing fingers can provide the necessary penetration of the fur without the user having to employ another grooming element.

Although the invention herein has been described with respect to various preferred embodiments, it should be understood that the invention is not strictly limited to these embodiments and that the invention should be broadly construed in connection with the appended claims.

What is claimed is:

1. An animal grooming device comprising:

a body;

a plurality of grooming elements secured to a bottom side the body, said grooming elements having substantially similar shapes and being spaced uniformly from one another along the bottom side;

an upper peripheral rim extending around a periphery of a top side of the body, said upper peripheral rim extending above the top side;

said top side of the body and said upper peripheral rim forming an enclosure;

an opening made in the top side of the body; and an applicator pad placed within said enclosure and through said opening, wherein the applicator extends beyond the top side and bottom side of the body.

2. The animal grooming device of claim 1, wherein:

said grooming elements are conical shaped.

3. The animal grooming device of claim 1, wherein:

said grooming elements have a durometer hardness of between about 40-60 durometer hardness.

4. The animal grooming device of claim 1, wherein:

said at least one depression includes two depression, one depression being located at each opposite end of the body.

5. The animal grooming device of claim 1, wherein:

said grooming device is symmetrical along a longitudinal axis thereof that extends along a length of the body.

6. The animal grooming device of claim 1, wherein:

said grooming device is symmetrical along a transverse axis thereof that extends transversely to a length of the body.

7. The animal grooming device of claim 1, wherein: said upper peripheral rim has a peripheral plurality of indentations that correspond with and extending uniformly with respect to said plurality of indentations formed on said outer side edge of the body.

8. The animal grooming device of claim 1, wherein: opposite ends of the body have outwardly curving side edges.

9. The animal grooming device of claim 1, wherein: said applicator pad has a shape that conforms to said enclosure in order to frictionally retain said applicator within said enclosure.

10. The animal grooming device of claim 9, wherein: said applicator pad has a single layer.

11. The animal grooming device of claim 9, wherein: said applicator pad has at least two layers.

12. The animal grooming device of claim 1, wherein: the applicator extends beyond the grooming elements.

13. The animal grooming device of claim 1, wherein: the applicator has a length that is longer than a width of the applicator, and the opening has a long side and short side, and the applicator is placed through the opening such that the length is aligned with the long side.

14. The animal grooming device of claim 13, wherein: a second layer of said applicator pad has a rougher texture than said first layer.

15. The animal grooming device of claim 1, wherein: the applicator has a length that is longer than a width of the applicator, and the opening has a long side and short side, wherein the applicator is placed through the opening such that the width is placed through the opening and the length is substantially perpendicular to the long side of the opening.

16. The animal grooming device of claim 1, wherein: the applicator has a length that is longer than a width of the applicator, and the applicator is folded prior to being placed through said opening.

17. A method of delivering a therapeutic material by a grooming device to an animal, said method comprising:

providing the grooming device having a body, a plurality of grooming elements secured to a bottom side of the body, an upper peripheral rim extending around a periphery of a top side of the body, said upper peripheral rim extending above the top side;

said top side of the body and said upper peripheral rim forming an enclosure, and an opening made in the body;

placing an applicator pad within said enclosure and through said opening, said applicator paid holding a quantity of the therapeutic material therein; and applying pressure to said body or said applicator pad causing the material to be dispensed from the applicator pad.

18. The method of claim 17, wherein: the therapeutic material is at least one of shampoo, conditioner, medications, or pheromones.

19. A method of delivering a therapeutic material by a grooming device to an animal, said method comprising:

providing the grooming device having a flexible and elastomeric body, a plurality of grooming elements secured to a bottom side of the body, an upper peripheral rim extending around a periphery of a top side of the body, said upper peripheral rim extending above the top side;

said top side of the body and said upper peripheral rim forming an enclosure, and an opening made in the body;

placing an applicator pad within said enclosure and through said opening, said applicator paid holding a quantity of the therapeutic material therein; and applying pressure to said body or said applicator pad causing the material to be dispensed from the applicator pad.

20. The method of claim 19, wherein: the body is twisted so to change an amount or rate of discharge of therapeutic material in the applicator.

21. The method of claim 19, wherein: the body is twisted so to increase a density of the applicator in areas of the applicator that become twisted.

22. The method of claim 19, wherein: the body is twisted in an angular range of between 1-180 degrees.

23. The method of claim 19, wherein: the body stretches substantially uniformly along areas where the body is twisted due to elasticity of the body.

* * * * *